(12) United States Patent
Takahashi

(10) Patent No.: US 11,429,431 B2
(45) Date of Patent: Aug. 30, 2022

(54) INFORMATION PROCESSING SYSTEM AND MANAGEMENT DEVICE

(71) Applicant: FUJITSU LIMITED, Kawasaki (JP)

(72) Inventor: Akane Takahashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 16/701,711

(22) Filed: Dec. 3, 2019

(65) Prior Publication Data

US 2020/0225981 A1    Jul. 16, 2020

(30) Foreign Application Priority Data

Jan. 11, 2019 (JP) .............................. JP2019-003215

(51) Int. Cl.
*G06F 9/455* (2018.01)
*G06F 9/48* (2006.01)

(52) U.S. Cl.
CPC ........ *G06F 9/4856* (2013.01); *G06F 9/45558* (2013.01); *G06F 2009/4557* (2013.01); *G06F 2009/45575* (2013.01); *G06F 2009/45579* (2013.01)

(58) Field of Classification Search
CPC .................................................. G06F 9/45558
USPC ............................................................ 718/1
See application file for complete search history.

(56) References Cited

U.S. PATENT DOCUMENTS

| | | | | |
|---|---|---|---|---|
| 9,197,489 | B1 * | 11/2015 | Vincent ................. | H04L 67/148 |
| 2008/0222375 | A1 * | 9/2008 | Kotsovinos ........... | G06F 9/5083 |
| | | | | 711/162 |
| 2009/0007106 | A1 * | 1/2009 | Araujo, Jr. .......... | G06F 9/45558 |
| | | | | 718/1 |
| 2011/0066597 | A1 * | 3/2011 | Mashtizadeh ......... | G06F 3/0617 |
| | | | | 707/640 |
| 2011/0225117 | A1 * | 9/2011 | Nakanishi ........... | G06F 11/3485 |
| | | | | 707/602 |
| 2012/0017031 | A1 * | 1/2012 | Mashtizadeh ....... | G06F 9/45545 |
| | | | | 711/6 |

(Continued)

FOREIGN PATENT DOCUMENTS

| | | |
|---|---|---|
| JP | 2013-542486 | 11/2013 |
| JP | 2015-111434 | 6/2015 |
| WO | WO 2012/033554 A1 | 3/2012 |

*Primary Examiner* — Mehran Kamran
(74) *Attorney, Agent, or Firm* — Staas & Halsey LLP

(57) ABSTRACT

An information processing system includes: a first information processing apparatus coupled to a first storage and including a first processor configured to execute, when a virtual processor operated in the first information processing apparatus executes an I/O processing for the first storage, a copy processing of copying target data of the I/O processing from the first storage to a second storage coupled to a second information processing apparatus, as a pre-processing of a relocation processing in which the virtual processor is relocated from the first information processing apparatus to the second information processing apparatus; and a management device including a second processor configured to: determine an execution timing of the relocation processing based on a performance influence level of I/O processings executed by the virtual processor after relocation; and output an instruction of executing the relocation processing at the execution timing to the first information processing apparatus.

12 Claims, 16 Drawing Sheets

(56) References Cited

U.S. PATENT DOCUMENTS

| | | | |
|---|---|---|---|
| 2014/0108854 A1* | 4/2014 | Antony | G06F 11/203 714/4.2 |
| 2014/0298338 A1* | 10/2014 | Doi | G06F 9/4856 718/1 |
| 2015/0261581 A1* | 9/2015 | Wang | G06F 3/0619 711/162 |
| 2016/0026489 A1* | 1/2016 | Maislos | G06F 9/45558 718/1 |
| 2016/0188353 A1* | 6/2016 | Shu | G06F 9/45558 718/1 |
| 2017/0359414 A1* | 12/2017 | Sengupta | G06F 9/45558 |
| 2017/0371696 A1* | 12/2017 | Prziborowski | G06F 9/45558 |
| 2018/0150335 A1* | 5/2018 | Doi | G06F 11/3089 |
| 2019/0012110 A1* | 1/2019 | Okano | G06F 3/0664 |
| 2019/0034217 A1* | 1/2019 | Aravot | G06F 3/065 |
| 2019/0278624 A1* | 9/2019 | Bade | G06F 9/50 |

* cited by examiner

INFORMATION PROCESSING SYSTEM AND MANAGEMENT DEVICE

CROSS-REFERENCE TO RELATED APPLICATION

This application is based upon and claims the benefit of the prior Japanese Patent Application No. 2019-003215, filed on Jan. 11, 2019, the entire contents of which are incorporated herein by reference.

FIELD

The embodiments discussed herein are related to an information processing system and a management device.

BACKGROUND

A virtual machine has been widely used as a technology of building a virtual application executing environment on a physical machine. As a technology of moving (migrating) virtual machines between physical machines, there are following suggestions.

For example, there has been suggested on-demand-type image streaming in which a virtual machine is immediately migrated without moving data onto a local storage, and the data is copied on demand when the migrated virtual machine needs the data. As another example, the following computer system has also been suggested. In the computer system, when a first virtual machine is moved to a computer where a second virtual machine is operating, data of a real page allocated to a virtual page with a low access frequency in a virtual volume of the second virtual machine is destaged from a directly connected storage to an external storage. Then, data of a real page allocated to a virtual page in a virtual volume of the first virtual machine is migrated to a free space generated in the directly connected storage.

As another technology of building a virtual application executing environment, there is a container virtualization technology. Unlike a virtual machine that performs a virtualization including even an operating system (OS), this technology virtualizes an application executing environment on the OS. Therefore, there is a characteristic in that the movement of containers generated by the container virtualization technology, between physical machines, is easier than the movement of virtual machines.

Meanwhile, since both the virtual machine and the container virtually provide separate process executing environments, it can be said that both are virtual process execution units operating on physical machines.

Related techniques are disclosed in, for example, Japanese National Publication of International Patent Application No. 2013-542486 and Japanese Laid-Open Patent Publication No. 2015-111434.

Meanwhile, in certain cases, a virtual storage accessed by the virtual process execution unit as described above may be realized by a local storage of a physical machine on which the process execution unit operates. Such a virtual storage is also called a direct attached storage (DAS)-type virtual storage. The DAS-type virtual storage has a characteristic that it is possible to execute Input/Output (I/O) processing of data with low latency.

Here, when the above process execution unit using the DAS-type virtual storage is relocated to another physical machine, there are following problems. When only the process execution unit is relocated to another physical machine and data of the virtual storage is not yet moved, the relocated process execution unit has to access a local storage of a physical machine before the relocation in order to access the data of the virtual storage. Therefore, the performance of the relocated process execution unit in I/O processing for the virtual storage is reduced.

SUMMARY

According to an aspect of the embodiments, an information processing system includes: a first information processing apparatus coupled to a first storage, the first information processing apparatus including a first processor configured to execute, when a virtual processor that is operated in the first information processing apparatus executes an I/O processing for the first storage, a copy processing of copying target data of the I/O processing from the first storage to a second storage coupled to a second information processing apparatus via the second information processing apparatus, as a pre-processing of a relocation processing in which the virtual processor is relocated from the first information processing apparatus to the second information processing apparatus; and a management device including a second processor configured to: determine an execution timing of the relocation processing based on a performance influence level of I/O processings executed by the virtual processor after relocation, the performance influence level being calculated from a result of monitoring I/O processings including the copy processing for the first storage executed by the virtual processor after start of the pre-processing; and output an instruction of executing the relocation processing at the execution timing to the first information processing apparatus and the second information processing apparatus.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Hereinafter, embodiments of the present disclosure will be described with reference to the accompanying drawings.

First Embodiment

Figure 1:
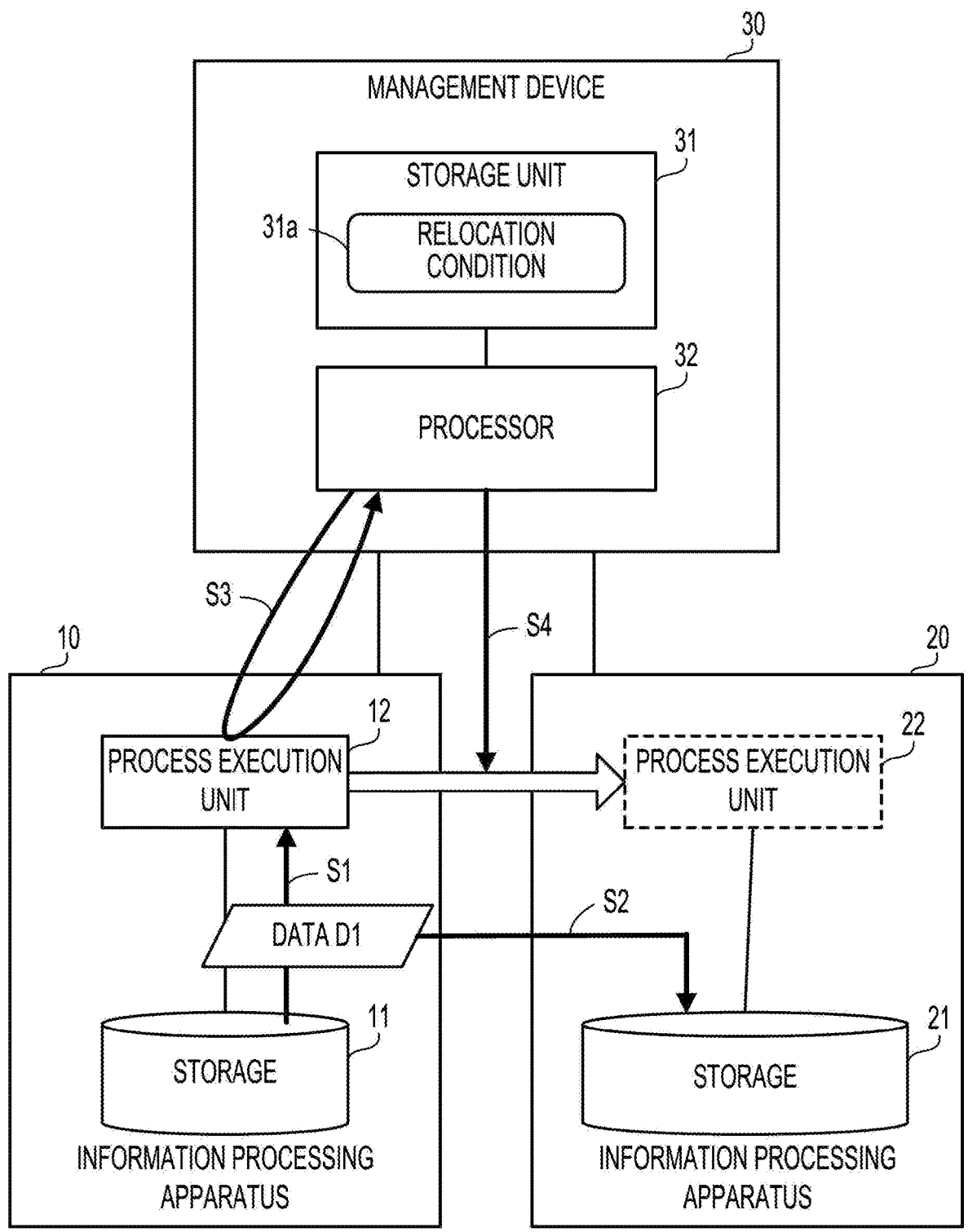
FIG. 1 is a view illustrating a configuration example and a processing example of an information processing system according to a first embodiment.

FIG. 1 is a view illustrating a configuration example and a processing example of an information processing system according to a first embodiment. The information processing system illustrated in FIG. 1 includes an information processing apparatus 10 (first information processing apparatus), an information processing apparatus 20 (second information processing apparatus), and a management device 30.

A storage 11 is connected to the information processing apparatus 10. In the information processing apparatus 10, a virtual process execution unit 12 is operating. The process execution unit 12 is, for example, an operation subject that operates using a process executing environment virtually constructed on the information processing apparatus 10, and is, for example, a container, or a hypervisor-type virtual machine managed by a hypervisor. The processing executed by the process execution unit 12 includes an I/O processing for the storage 11. The storage 11 is a storage area used by the process execution unit 12.

A storage 21 is connected to the information processing apparatus 20. The information processing apparatus 20 is an information processing apparatus that is a relocation destination of the process execution unit 12. In FIG. 1, the relocated process execution unit 12 is illustrated as a process execution unit 22.

The management device 30 is a device that manages operations of the information processing apparatuses 10 and 20. In particular, the management device 30 manages a relocation processing of the process execution unit 12 operating in the information processing apparatus 10. The management device 30 includes a storage unit 31 and a processor 32. The storage unit 31 is realized as, for example, a storage area of a storage device (not illustrated) included in the management device 30. The processor 32 is realized as, for example, a processor (not illustrated) included in the management device 30.

The storage unit 31 stores a relocation condition 31a that determines the execution timing of a relocation processing of the process execution unit 12. The processor 32 monitors the operating status of the information processing apparatus 10, and determines the execution timing of a relocation processing of relocating the process execution unit 12 from the information processing apparatus 10 to the information processing apparatus 20 on the basis of the operating status and the relocation condition 31a.

Hereinafter, a relocation control of the process execution unit 12 will be described in detail.

First, the information processing apparatus 10 on which the process execution unit 12 is operating may take a first operating mode and a second operating mode. The first operating mode is a normal operating mode, and in this operating mode, when the process execution unit 12 executes a processing of data I/O with the storage 11, data is simply sent and received between the process execution unit 12 and the storage 11. Then, according to the occurrence of a predetermined event, the processor 32 of the management device 30 switches the operating mode of the information processing apparatus 10 from the first operating mode to the second operating mode. For example, it is assumed that there is a plurality of information processing apparatuses including the information processing apparatus 20. In this case, the processor 32 monitors the operating state of each information processing apparatus, and switches the operating mode of the information processing apparatus 10 from the first operating mode to the second operating mode when determining the information processing apparatus 20, as a relocation destination of the process execution unit 12, on the basis of the operating state.

In the second operating mode state, the information processing apparatus 10 executes the following processing as a pre-processing of a relocation processing. When the process execution unit 12 executes an I/O processing for the storage 11, the information processing apparatus 10 copies data as a target of the I/O processing from the storage 11 to the storage 21 via the information processing apparatus 20. For example, when the process execution unit 12 requests reading of data D1 from the storage 11, the data D1 is read from the storage 11 to the process execution unit 12 (step S1). At the same time, the information processing apparatus 10 transmits the data D1 to the information processing apparatus 20, and copies the data D1 to the storage 21 via the information processing apparatus 20 (step S2).

Meanwhile, the processor 32 of the management device 30 monitors the execution status of the I/O processing for the storage 11 from the process execution unit 12 in the information processing apparatus 10 (step S3). The processor 32 determines the execution timing of the relocation processing of the process execution unit 12, on the basis of the performance influence level of the I/O processing by the relocated process execution unit 22, which is calculated from the monitoring result of the I/O processing. When the performance influence level reaches a value satisfying the relocation condition 31a, the processor 32 determines that the execution timing of the relocation processing of the process execution unit 12 has come, and outputs the execution instruction of the relocation processing to the information processing apparatuses 10 and 20 (step S4). By the execution instruction of the relocation processing, relocation of the process execution unit 12 is performed. That is, the operation of the process execution unit 12 before relocation is stopped and the operation of the process execution unit 22 after relocation is started.

The information processing apparatus 20 starts the operation of the process execution unit 22 according to the execution instruction of the relocation processing. The process execution unit 22 executes an I/O processing for the storage 21, for data already copied to the storage 21, among data pieces stored in the storage 11. Meanwhile, the process execution unit 22 executes an I/O processing for the storage 11, for data not copied to the storage 21, among data pieces stored in the storage 11, via the information processing apparatus 10. For example, when data requested to be read by the process execution unit 22 is not copied to the storage 21, the data is read from the storage 11 and is transmitted from the information processing apparatus 10.

Here, when the data is read from the storage 11 and transmitted, the latency for data use by the process execution unit 22 becomes larger, and the I/O processing performance of the process execution unit 22 becomes lower than that when the data is read from the storage 21. The reduction of the I/O processing performance of the process execution unit 12 results in a reduction of the processing performance of the process execution unit 22 itself.

Meanwhile, it may be estimated that among data pieces stored in the storage 11, data for which the I/O processing is executed by the process execution unit 12 before the relocation is data frequently used by the process execution unit 12. Therefore, when such data is copied to the storage 21 before the relocation of the process execution unit 12, there is a high probability that the I/O processing for the storage 21 is executed when the relocated process execution unit 22 attempts to execute the I/O processing. This may suppress the reduction of the I/O processing performance of the process execution unit 22, which is caused by the relocation, and as a result, the processing performance of the process execution unit 22 itself may be improved.

The execution timing of the relocation processing of the process execution unit 12 after the information processing apparatus 10 is switched to the second operating mode is determined on the basis of the performance influence level of the I/O processing by the relocated process execution unit 22. The performance influence level is calculated on the basis of the monitoring result of the I/O processing for the storage 11 by the process execution unit 12 along with the copy processing after the start of the pre-processing. Accordingly, the process execution unit 12 may be relocated in a state where a reduction width of the I/O processing performance of the process execution unit 22, which is caused by the relocation, is small.

For example, when there are a relatively high number of data pieces frequently used by the process execution unit 12 before the relocation, among data pieces stored in the storage 11, it is desirable that after data pieces in the storage 11 are copied to the storage 21 to a certain extent, the process execution unit 12 is relocated. Therefore, the processor 32 determines the relocation timing of the process execution unit 12 on the basis of a copy status of the data from the storage 11 to the storage 21 according to, for example, the execution of the I/O processing for the storage 11 by the process execution unit 12.

When there are a relatively low number of data pieces used by the process execution unit 12 before the relocation, among data pieces stored in the storage 11, even when the relocation of the process execution unit 12 is executed in an early stage, the performance reduction width of the I/O processing by the relocated process execution unit 22 does not become so large. Therefore, the processor 32 determines the relocation timing of the process execution unit 12 on the basis of, for example, the ratio of a data amount not copied to the storage 21 to a data amount stored in the storage 11.

Through such a processing, it is possible to suppress the reduction of the I/O processing performance of the relocated process execution unit 22 while minimizing the time until the relocation processing of the process execution unit 12 is executed after the information processing apparatus 10 is switched to the second operating mode and starts the pre-processing. Otherwise, it is possible to suppress the reduction of the I/O processing performance of the relocated process execution unit 22 while minimizing the amount of data transmitted from the storage 11 to the storage 21.

Second Embodiment

Hereinafter, descriptions will be made on a case where a container is applied as an example of a virtual process execution unit, as a second embodiment.

Figure 2:
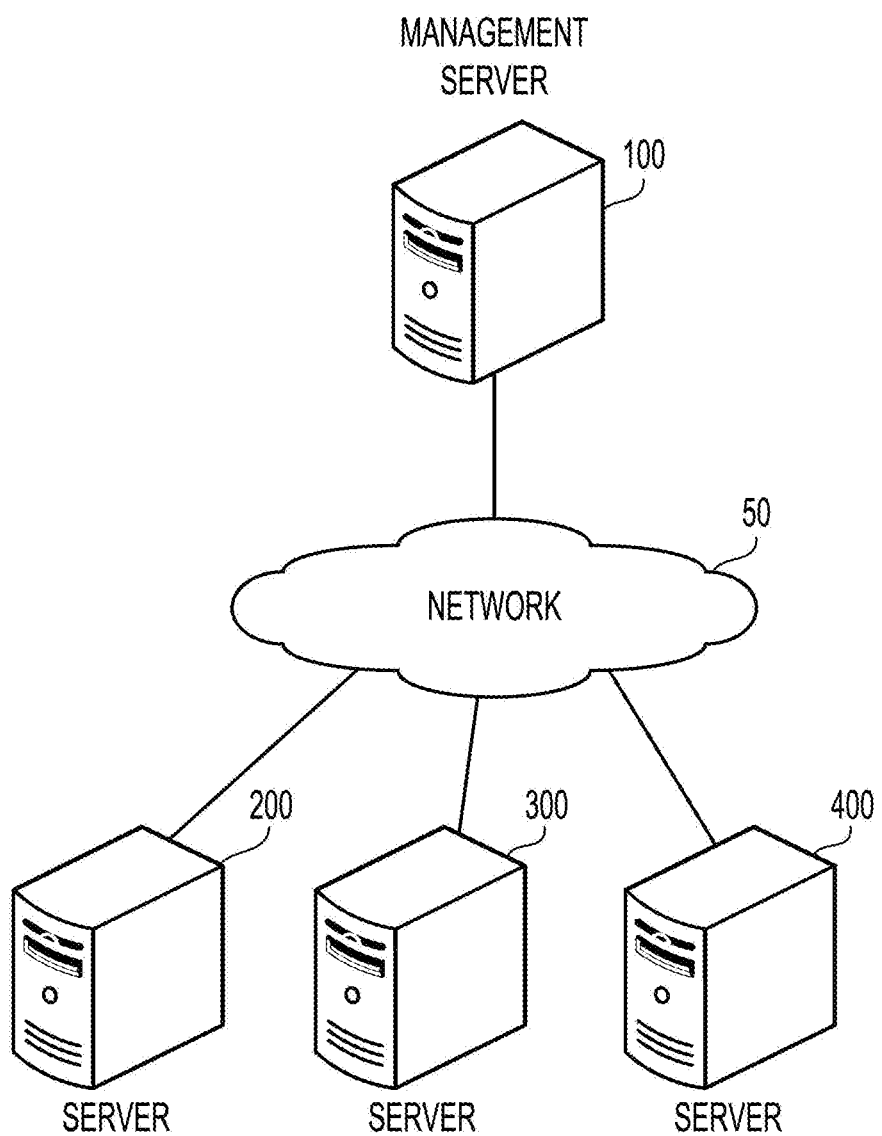
FIG. 2 is a view illustrating a configuration example of an information processing system according to a second embodiment.

FIG. 2 is a view illustrating a configuration example of an information processing system according to the second embodiment. As illustrated in FIG. 2, the information processing system according to the second embodiment includes a management server 100, and servers 200, 300, 400, which are managed by the management server 100. The management server 100, and the servers 200, 300, 400, . . . managed by the management server 100 are connected to each other via a network 50.

The management server 100 is a server computer that manages operations of the servers 200, 300, 400, . . . . In particular, the management server 100 performs a container operation management on the servers 200, 300, 400, . . . , or a container arrangement control for the servers 200, 300, 400, . . . . The servers 200, 300, 400, . . . , for example, server computers which execute various processings such as a business processing.

Meanwhile, each of the servers 200, 300, 400, . . . is an example of the information processing apparatus 10 or the information processing apparatus 20 illustrated in FIG. 1. Further, the management server 100 is an example of the management device 30 illustrated in FIG. 1.

Figure 3:
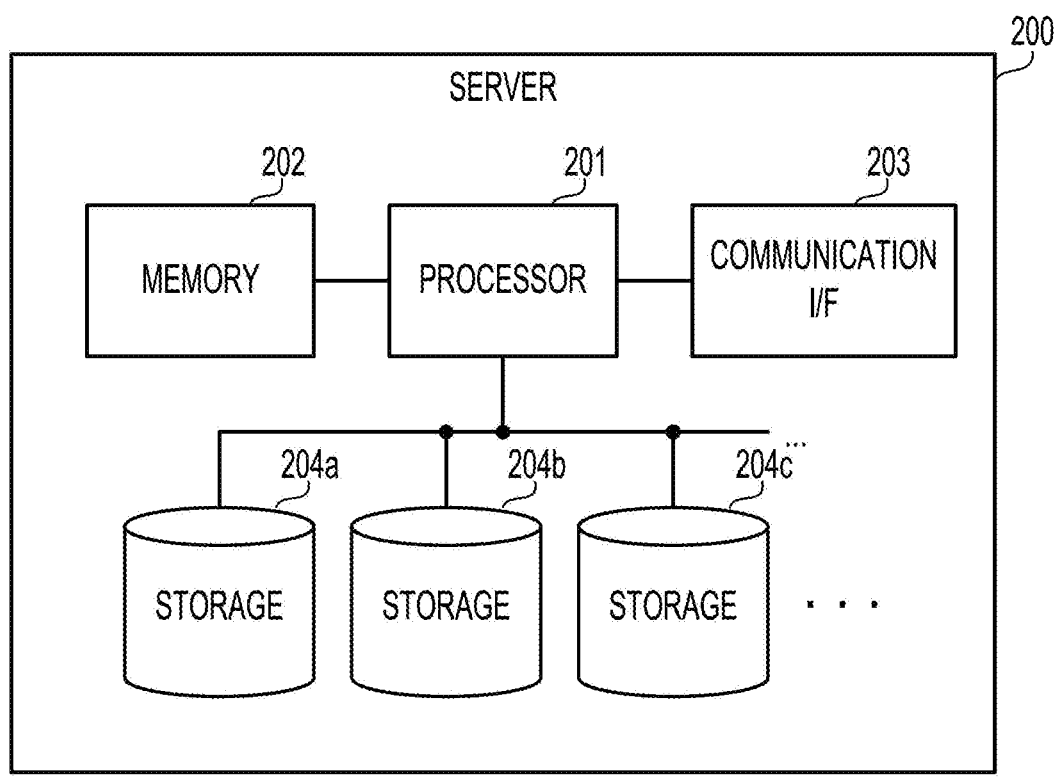
FIG. 3 is a view illustrating a hardware configuration example of a server.

FIG. 3 is a view illustrating a hardware configuration example of a server. Meanwhile, in FIG. 3, the server 200 is illustrated, but other servers 300, 400, . . . are also realizable by the same hardware configurations as that for the server 200.

The server 200 includes a processor 201, a memory 202, a communication interface (I/F) 203, and storages 204a, 204b, 204c, . . . .

The processor 201 is a processing device that reads a program from the memory 202 and processes the program. The processor 201 is, for example, a central processing unit (CPU), a micro processing unit (MPU), a digital signal processor (DSP), an application specific integrated circuit (ASIC), or a programmable logic device (PLD). The processor 201 may be a combination of two or more elements of the CPU, the MPU, the DSP, the ASIC, and the PLD.

The memory 202 is a volatile storage device such as a dynamic random access memory (DRAM), and is used as a main storage device of the server 200. The memory 202 temporarily stores at least a part of an application program or an OS program to be executed by the processor 201. The memory 202 also stores various data required for processings by the processor 201.

The communication I/F 203 is an interface device for communicating with another device such as the management server 100 via the network 50. The storages 204a, 204b, 204c, . . . are direct connection-type physical storages called a DAS, and are, for example, non-volatile storage devices such as solid state drives (SSDs) or hard disk drives (HDDs). The storages 204a, 204b, 204c, . . . are local storages of the server 200, which communicate with the processor 201 via an interface such as serial attached SCSI (SAS, SCSI: Small Computer System Interface) or serial advanced technology attachment (SATA). Meanwhile, the storages 204a, 204b, 204c, . . . may be arranged outside the server 200 and connected to the server 200 without interposition of a network.

Meanwhile, a program to be executed by the processor 201 is stored in, for example, a portable recording medium (not illustrated), and is read onto the memory 202. Otherwise, the program is stored in a database, etc. of a computer system connected via the network 50, and is read from such a database and is read onto the memory 202.

The management server 100 is also realizable as a computer with the hardware configuration illustrated in FIG. 3.

Figure 4:
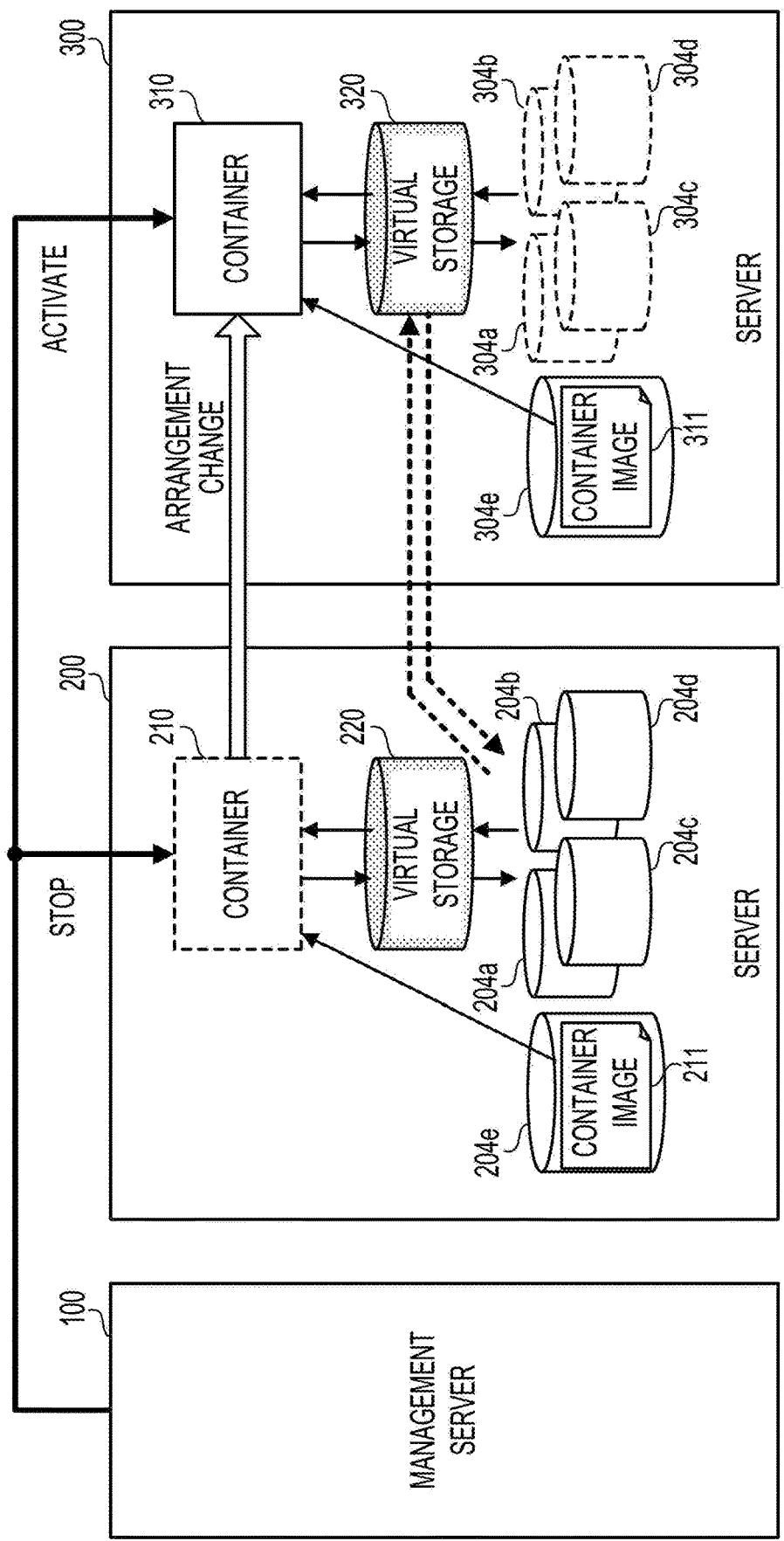
FIG. 4 is a view for explaining a comparative example of a container movement processing.
Figure 5:
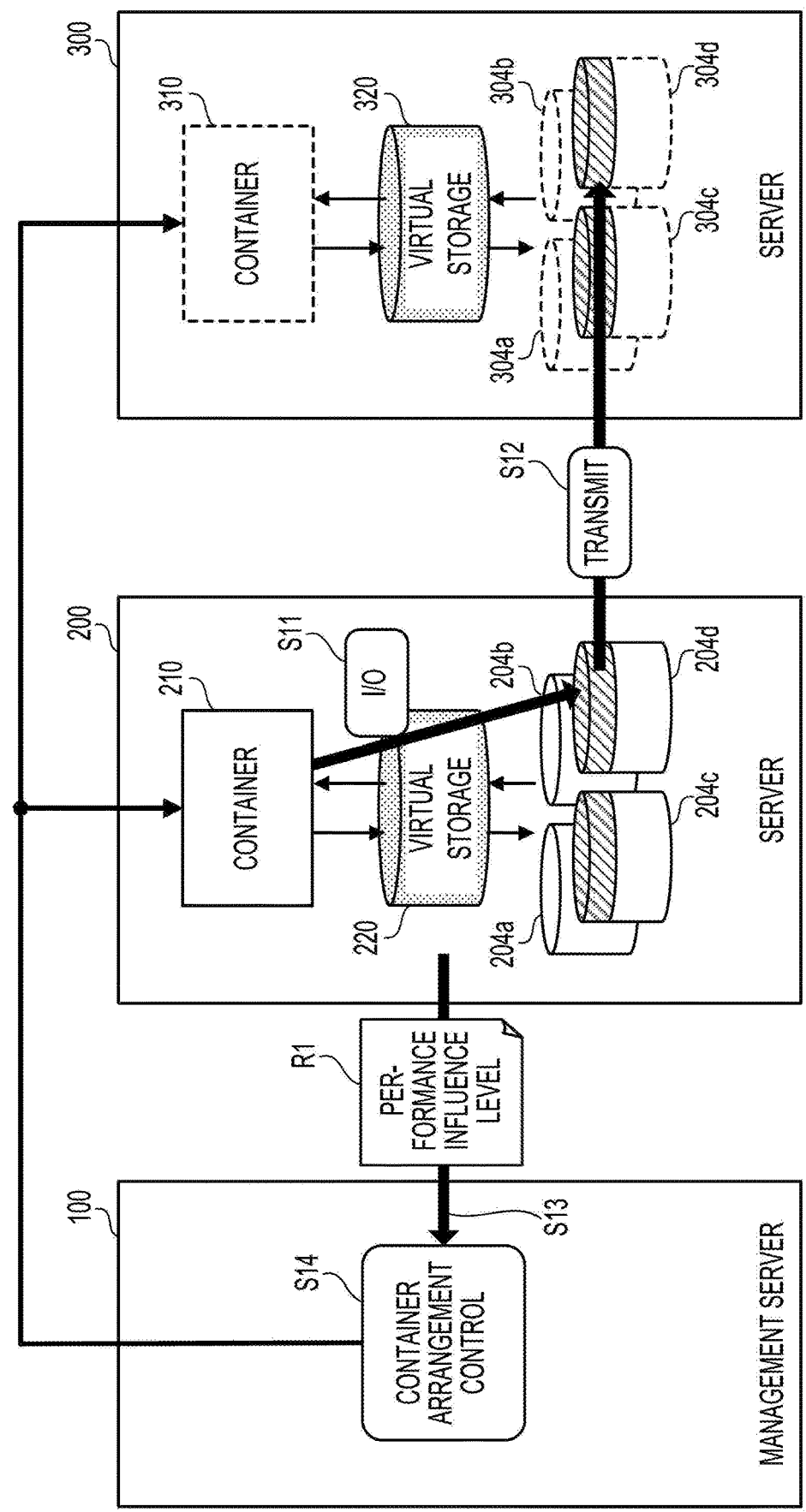
FIG. 5 is a view for explaining a container movement processing in the second embodiment.

Next, descriptions will be made on a container movement (arrangement change) between servers by using FIG. 4 and FIG. 5. First, a comparative example of the container movement processing will be described by using FIG. 4, and then the container movement processing in the present embodiment will be described by using FIG. 5. In FIG. 4 and FIG. 5, as an example, descriptions will be made on a case where a container is moved from the server 200 to the server 300.

FIG. 4 is a view for explaining a comparative example of the container movement processing.

A container virtualization technology is a technology of constructing an independent application executing environment on an OS. It may also be said that the container virtualization technology provides different OS environments by separating processes in a single OS kernel environment. Containers are virtual user spaces separated from each other in an environment where a single OS program is executed. The user spaces are provided as resource groups separated from each other, which are for executing application programs. For example, individual memory spaces are allocated to the containers.

In FIG. 4, as an example, a container 210 is operating in the server 200. An application processing such as a business processing is executed by the container 210. In the example of FIG. 4, a container image 211 including data required for the execution of the container 210 is stored in a storage 204e. The container image 211 includes an application program. When the container image 211 is read by a container management function called a container engine, the container 210 is activated.

In the server 200, a virtual storage 220 is set as a storage area usable by the container 210. As an example, it is assumed that the virtual storage 220 is realized by storage areas of the storages 204a to 204d among physical storages included in the server 200. According to the application program, the container 210 performs writing of data to the virtual storage 220, or reading of data written to the virtual storage 220.

As described above, the virtual storage 220 is realized as a DAS-type virtual storage using local physical storages such as the storages 204a to 204d. Therefore, the container 210 may execute data I/O processing for the virtual storage 220 with low latency. The performance improvement in I/O processing for the virtual storage 220 by the container 210 causes an effect of improving the processing performance of an application operating on the container 210. In particular, for an application with more data accesses, the effect of improving the processing performance is significantly obtained.

Meanwhile, the container virtualization technology is a technology of constructing a virtual environment not at an OS level as in the virtual machine, but at an application level. The virtual machine mentioned herein refers to a virtual machine (hypervisor-type virtual machine) realized by a hypervisor. However, the container and the hypervisor-type virtual machine share a feature in that a virtual process executing environment is constructed on a physical machine. In this sense, it may also be said that the container is also a kind of virtual machine.

However, since the activation of the container corresponds to the activation of a process on the OS, the activation of the container is faster than the activation of the hypervisor-type virtual machine. In the construction of the container, the memory usage amount is smaller than that in the hypervisor-type virtual machine. Due to such a characteristic, the movement of the container between servers is easier than the movement of the hypervisor-type virtual machine, and the processing time required for the movement is also shorter. Therefore, in general, there are more chances for movement of the container than the hypervisor-type virtual machine. Also, there are many chances for update of the application program operating on the container, and there are many cases where the container is moved due to the necessity of scale-up/down of actual machines or systems according to the update.

Here, a case where the container 210 illustrated in FIG. 4 is moved from the server 200 to the server 300 is taken into consideration. The movement of the container 210 is controlled by the management server 100. The management server 100 stores a container image 311 that is a copy of the container image 211 corresponding to the container 210, in an actual storage of the server 300 (a storage 304e in the example of FIG. 4) before the container 210 is moved. Then, the management server 100 stops the operation of the container 210, and activates a container 310 on the server 300 on the basis of the stored container image 311. Accordingly, the container 310 that executes the same processing as the container 210 before the movement operates on the server 300.

A virtual storage 320 illustrated in FIG. 4 is a virtual storage usable by the moved container 310, and is obtained by moving the virtual storage 220. In the server 300, storage areas of storages 304a to 304d which are local storages of the server 300 may be allocated as a physical area of the virtual storage 320.

However, in a status where only the container movement is executed by the activation of the container 310, and data of the virtual storage 220 is not moved, the storage areas of local storages of the server 200 are still allocated to the moved virtual storage 320. Therefore, the moved container 310 has to access the server 200 in order to use data of the virtual storage 320, and the latency for data use increases. Then, the data of the virtual storage 220 is sequentially transmitted from the local storages of the server 200 to the local storages of the server 300, but the fact remains that for use of non-transmitted data, the container 310 has to access the server 200.

As described above, when the DAS-type virtual storage is used, the transmission of data within the virtual storage between servers is not capable of following the high-speed movement of the container between the servers. Even when the container is movable in a short time, the locality of data used by the container deteriorates in the period immediately after the movement, and the performance of the data I/O processing by the container is reduced. As a result, there is a problem in that the processing performance of an application operating on the container is reduced.

As another method of maintaining the data locality immediately after the container movement, for example, a method of transmitting all data pieces in the virtual storage, to a local storage of a server as a movement destination before the container movement is taken into consideration. However, in this method, there is a problem in that it takes a relatively long time until the container actually becomes movable from a time when it is determined that the container movement is required. In some cases, not all data pieces stored in the virtual storage corresponding to the container are necessarily needed after the container movement. In the method of transmitting all data pieces of the virtual storage in advance, there is a possibility that useless data not used after the container movement is transmitted, and correspondingly, there is also a problem in that the processing efficiency is lowered.

FIG. 5 is a view for explaining the container movement processing in the second embodiment.

In the present embodiment, when determining that movement of the container 210 is required, and determining a server as a movement destination (here, the server 300), the management server 100 switches an operating mode of the server 200 as a movement source to an I/O transmission mode. When an I/O request for the virtual storage 220 is issued from the container 210, the server 200 switched to the I/O transmission mode executes the I/O processing (step S11). In addition, the server 200 transmits I/O processing target data to a local storage of the server 300 (step S12). Accordingly, the I/O processing target data in a local storage of the server 200 is also copied to the local storage of the server 300.

A performance influence level R1 for determining a movement timing of the container 210 is periodically transmitted from the server 200 to the management server 100 (step S13). The performance influence level R1 is an index indicating the magnitude of an influence on the performance of the moved container 310, and is calculated on the basis of a transmission status of data from the server 200 to the server 300. The value of the performance influence level R1 increases as the performance of the moved container 310 is likely to be greatly reduced.

The management server 100 executes a container arrangement control on the basis of the performance influence level R1 transmitted from the server 200 (step S14). In the container arrangement control, when determining that the influence on the performance of the moved container 310 has been reduced to a certain extent from the performance influence level R1, the management server 100 stops the container 210 on the server 200 and activates the container 310 on the server 300.

Data in the virtual storage 220 for which I/O processing is requested from the container 210 before the movement is estimated to be likely to be used for the moved container 310, and thus, the necessity of transmission is high. Therefore, in the above processing, the data that is highly required to be transmitted in this manner is preferentially transmitted to the server 300 before the container 210 is moved. Accordingly, even when not all data pieces in the virtual storage 220 are transmitted to the server 300, it is possible to increase the probability that the moved container 310 accesses data in the local storage of the server 300.

On the basis of the performance influence level R1, when data transmission has progressed to such an extent that it is estimated that a performance reduction width of the moved container 310 falls within a predetermined range immediately after the movement, the container movement is executed. Accordingly, it is possible to minimize the time until the movement is actually performed after it is determined that the movement of the container 210 is required. It is possible to reduce the possibility that among data pieces stored in the virtual storage 220, useless data is transmitted.

Meanwhile, it is desirable that as the server as a movement destination of the container, a server appropriate for the movement destination at the actual execution timing of the container movement, which has a low processing load at that time point, is determined. In the above described method of transmitting all data pieces of the virtual storage 220 in advance before the container movement, since it takes time to transmit data, it is desirable to determine the server as the movement destination of the container at a point in time when data transmission is completed. In this case, when there is a plurality of servers as movement destination candidates of the container, data in the virtual storage needs to be transmitted, in advance, to all the servers as the movement destination candidates. Therefore, there is also a problem in that when a movement destination candidate server is determined and the container is moved to the server, data transmitted to other servers becomes useless.

According to the method of the present embodiment illustrated in FIG. 5, even when the movement destination is determined at the actual execution timing of the container movement after it is determined that the movement of the container 210 is required, it is possible to suppress a data amount transmitted to all the servers as the movement destination candidates until the movement destination is determined. Meanwhile, even when the movement destination is determined at a timing when it is determined that the movement of the container 210 is required, it is possible to minimize a time difference until the container movement is actually executed. Therefore, a variation of the operating status (a load status, etc.) of the movement destination server from the determination of the movement destination to the execution of the container movement is reduced. As a result, it is possible to reduce the possibility that the container 210 is moved to an inappropriate server whose processing load is increased due to the time difference.

Meanwhile, in FIG. 5, the servers 200 and 300 and the management server 100 are examples of the information processing apparatuses 10 and 20, and the management device 30, respectively, illustrated in FIG. 1. Each of the storages 204*a* to 204*d* is an example of the storage 11 illustrated in FIG. 1, and the container 210 is an example of the process execution unit 12 illustrated in FIG. 1. Each of the storages 304*a* to 304*d* is an example of the storage 21 illustrated in FIG. 1, and the container 310 is an example of the process execution unit 22 illustrated in FIG. 1.

Next, the container movement processing in the information processing system according to the present embodiment will be described in detail.

Figure 6:
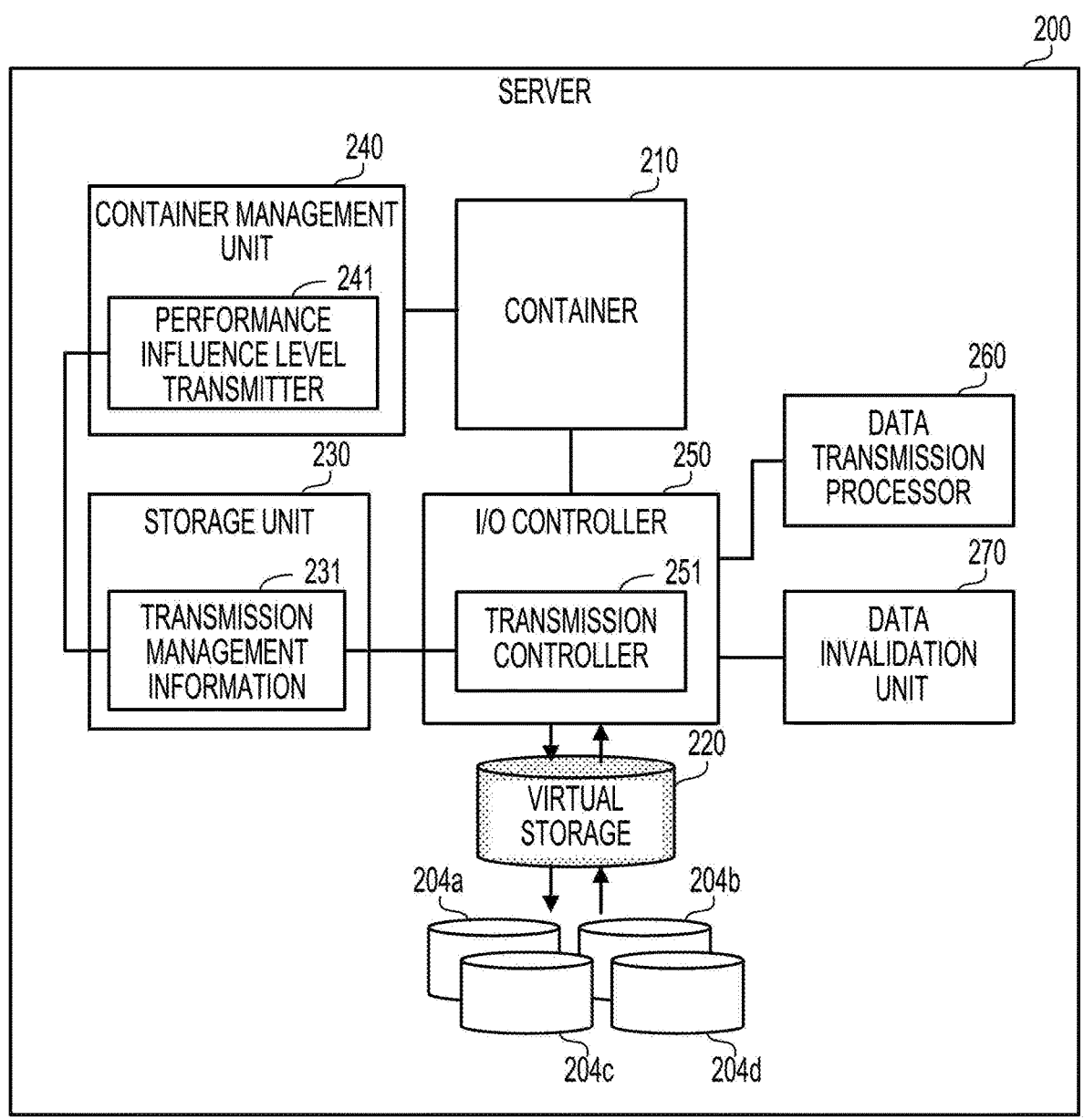
FIG. 6 is a block diagram illustrating a configuration example of processing functions included in the server.

First, FIG. 6 is a block diagram illustrating a configuration example of processing functions included in the server. Meanwhile, in FIG. 6, the server 200 is illustrated, but other servers 300, 400, . . . also include the same processing functions as that for the server 200.

The server 200 includes a storage unit 230, a container management unit 240, an I/O controller 250, a data transmission processor 260, and a data invalidation unit 270. The storage unit 230 is realized by the storage area of the storage device included in the server 200 such as, for example, the memory 202. Processings of the container management unit 240, the I/O controller 250, the data transmission processor 260, and the data invalidation unit 270 are realized when the processor 201 executes a certain program.

The storage unit 230 stores transmission management information 231. The transmission management information 231 is information indicating a transmission status when data within a virtual storage used by a container is transmitted to a server as a movement destination, in an I/O transmission mode. For example, the transmission management information 231 is a bitmap having a bit for each block in the virtual storage. In this case, when data in a block is transmitted, a corresponding bit on the bitmap is changed from "0" to "1."

The container management unit 240 is a container engine that manages the operation of the container in the server 200.

In the following description, similarly to FIG. 5, it is assumed that the container 210 operates under the management of the container management unit 240. It is assumed that data used by the container 210 is stored in the virtual storage 220 realized by the storages 204a to 204d. Then, it is assumed that the transmission management information 231 indicates the transmission status of data stored in the virtual storage 220.

The container management unit 240 has a function of collecting performance information of the server 200 and transmitting the performance information to the management server 100 in a normal mode (an operating mode other than the I/O transmission mode). The performance information is information used to determine whether the container movement is necessary or a server as an optimum movement destination. As the performance information, for example, the usage rate of the processor 201 or the memory 202 of the server 200, the usage rate of the processor 201 or the memory 202 for each container operating in the server 200, etc. are collected.

The container management unit 240 includes a performance influence level transmitter 241 that is activated in the I/O transmission mode. The performance influence level transmitter 241 calculates a performance influence level on the basis of the transmission management information 231, and transmits the performance influence level to the management server 100.

The I/O controller 250 controls an I/O processing for the virtual storage, according to a request from the container. In a state where the container 210 is operating, the I/O controller 250 controls an I/O processing for the virtual storage 220, according to a request from the container 210. The I/O controller 250 includes a transmission controller 251 that is activated in the I/O transmission mode. When receiving an I/O request for the virtual storage from the container, the I/O controller 250 executes the I/O processing for the virtual storage, and transmits I/O processing target data to a local storage of a server as a movement destination of the container.

The data transmission processor 260 executes transmission of data of the virtual storage to/from other servers 300, 400, . . . .

When the container movement is executed, the data invalidation unit 270 invalidates data that has already been transmitted to the local storage of the movement destination server, among data pieces in the virtual storage corresponding to the container before the movement.

Figure 7:
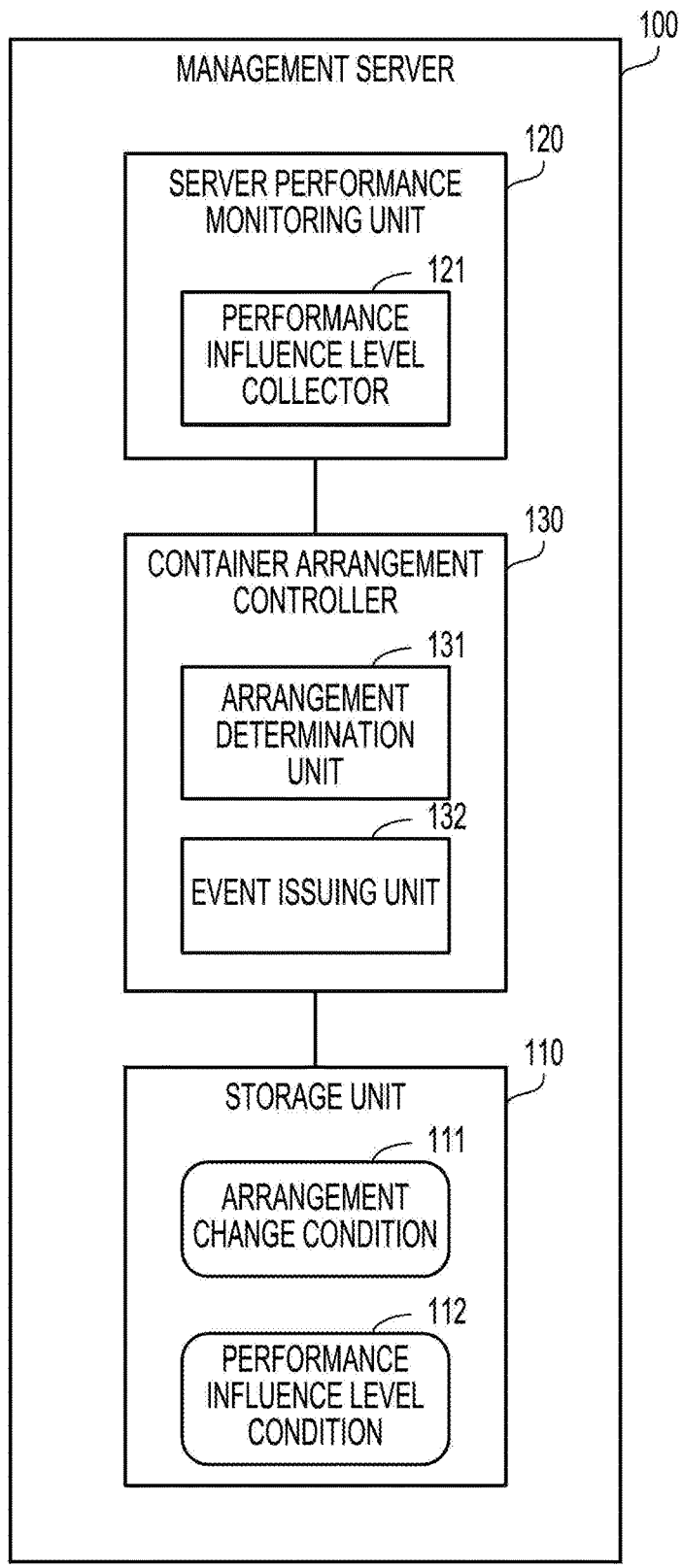
FIG. 7 is a block diagram illustrating a configuration example of processing functions included in a management server.

FIG. 7 is a block diagram illustrating a configuration example of processing functions included in the management server. The management server 100 includes a storage unit 110, a server performance monitoring unit 120, and a container arrangement controller 130. The storage unit 110 is realized by the storage area of the storage device included in the management server 100. Processings of the server performance monitoring unit 120 and the container arrangement controller 130 are realized when a processor included in the management server 100 executes a certain program.

The storage unit 110 stores an arrangement change condition 111 and a performance influence level condition 112 as information referred to in the determination processing of the container arrangement controller 130. The arrangement change condition 111 indicates a condition of performance information related to a container arrangement change. The arrangement change condition 111 includes a movement condition for determining the movement of a container, and a movement destination condition for determining a server as a movement destination of the container. The performance influence level condition 112 indicates a condition of a performance influence level for determining to execute the container movement.

The server performance monitoring unit 120, in a normal mode, collects performance information from the servers 200, 300, 400, . . . , so as to monitor the performance of each of the servers 200, 300, 400, . . . or each operating container. The server performance monitoring unit 120 includes a performance influence level collector 121 that is activated when a server is switched to an I/O transmission mode. The performance influence level collector 121 collects a performance influence level from a movement source server of a container.

The container arrangement controller 130 executes a container arrangement control in each of the servers 200, 300, 400, . . . . The container arrangement controller 130 includes an arrangement determination unit 131 and an event issuing unit 132.

When each of the servers 200, 300, 400, . . . is placed in the normal mode, the arrangement determination unit 131 determines whether there is a container to be moved on the basis of the performance information collected from the servers 200, 300, 400, . . . . When there is a container to be moved, the container arrangement controller 130 determines a server as a movement destination of the container on the basis of the performance information from servers other than a server where the container operates. When any one of the servers is placed in the I/O transmission mode, the arrangement determination unit 131 determines a timing for execution of the container movement on the basis of a performance influence level collected from the server.

The event issuing unit 132 issues events that cause the servers 200, 300, 400, . . . to execute various processings. These events include stopping or activation of a container, change of an operating mode, etc.

Next, a processing in a case where the container 210 on the server 200 is moved to the server 300 will be described by using FIG. 8 to FIG. 11.

Figure 8:
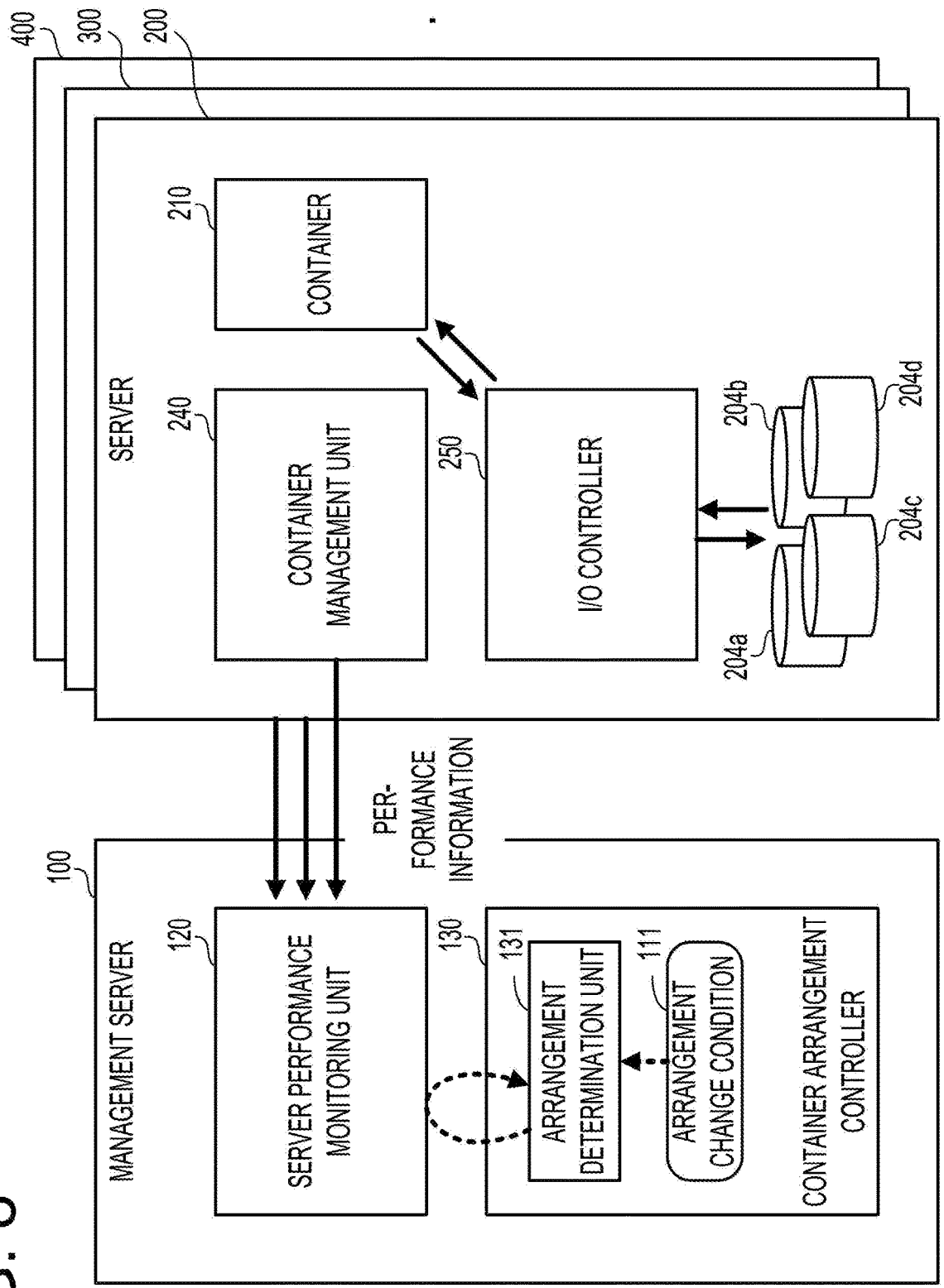
FIG. 8 is a view illustrating a state before a container as a movement target is detected.

FIG. 8 is a view illustrating a state before a container as a movement target is detected. In the state of FIG. 8, the servers 200, 300, 400, . . . are operating in a normal mode. Among these servers, in a server where a container is activated, the container accesses a virtual storage via an I/O controller. For example, in the server 200, the container 210 accesses the virtual storage 220 via the I/O controller 250. Accordingly, an I/O processing of a local storage (the storages 204a to 204d) is performed. Transmission of data in the virtual storage, between servers, is not performed.

In this state, the container management unit of each of the servers 200, 300, 400, . . . periodically collects performance information and transmits the performance information to the management server 100. As the performance information, for example, the usage rate of a processor or a memory of each server, and the usage rate of the processor or the memory by an operating container are transmitted.

The server performance monitoring unit 120 of the management server 100 receives the performance information from the servers 200, 300, 400, . . . . The arrangement determination unit 131 of the container arrangement controller 130 acquires performance information of each container among performance information pieces received by the server performance monitoring unit 120, and determines whether there is a container whose performance information satisfies a movement condition included in the arrangement change condition 111. As the movement condition, for example, a condition that the usage rate of a processor by the container is lower than a predetermined first value, or the usage rate of a memory by the container is lower than a predetermined second value is applied.

Figure 9:
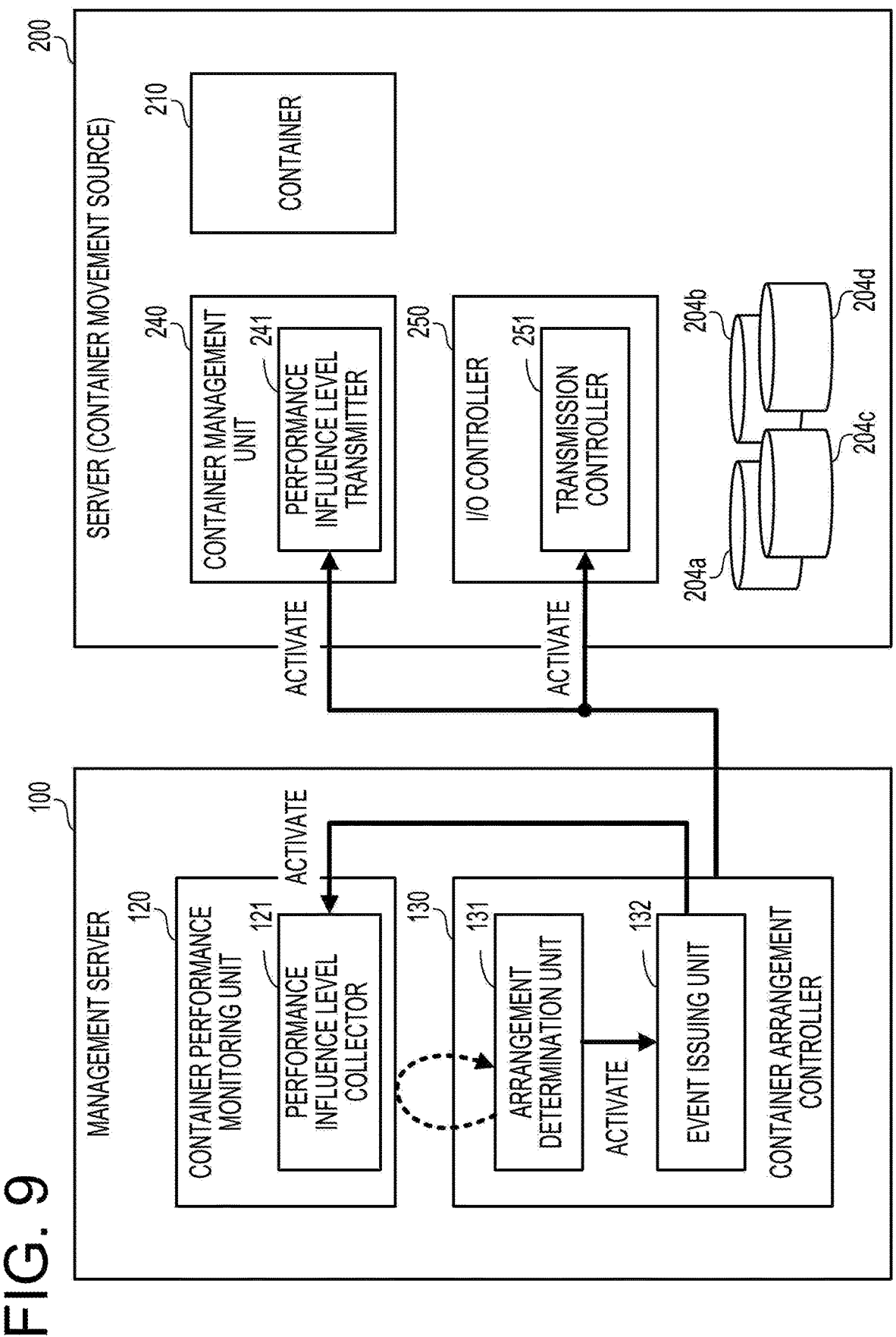
FIG. 9 is a view illustrating a state where a container as a movement target is detected.

Then, when a container whose performance information satisfies the movement condition appears, the container is detected as a movement target, and then, the following processing as in FIG. 9 is performed. Here, the arrangement determination unit 131 acquires performance conditions from servers other than a server where the container as the movement target operates, from the server performance monitoring unit 120, and compares a performance condition of each server to a movement destination condition included in the arrangement change condition 111. As the movement destination condition, for example, a condition that the usage rate of a processor in the server is lower than a predetermined third value, or the usage rate of a memory in the server is lower than a predetermined fourth value is applied. Then, the arrangement determination unit 131 determines a server whose performance condition satisfies the movement destination condition, as a server as a movement destination to which the container as the movement target is moved.

FIG. 9 is a view illustrating a state where a container as a movement target is detected. In FIG. 9, as an example, it is assumed that the container 210 of the server 200 is detected as the movement target.

When detecting the container 210 as the movement target, the arrangement determination unit 131 of the management server 100 activates the event issuing unit 132. The event issuing unit 132 activates the performance influence level collector 121 of the server performance monitoring unit 120. The event issuing unit 132 requests the server 200 as a container movement source to activate the performance influence level transmitter 241 of the container management unit 240, and the transmission controller 251 of the I/O controller 250. Accordingly, the event issuing unit 132 switches the server 200 from the normal mode to an I/O transmission mode.

The arrangement determination unit 131 copies a container image corresponding to the container 210, which is stored in a local storage of the server 200, to a local storage of the server 300.

Figure 10:
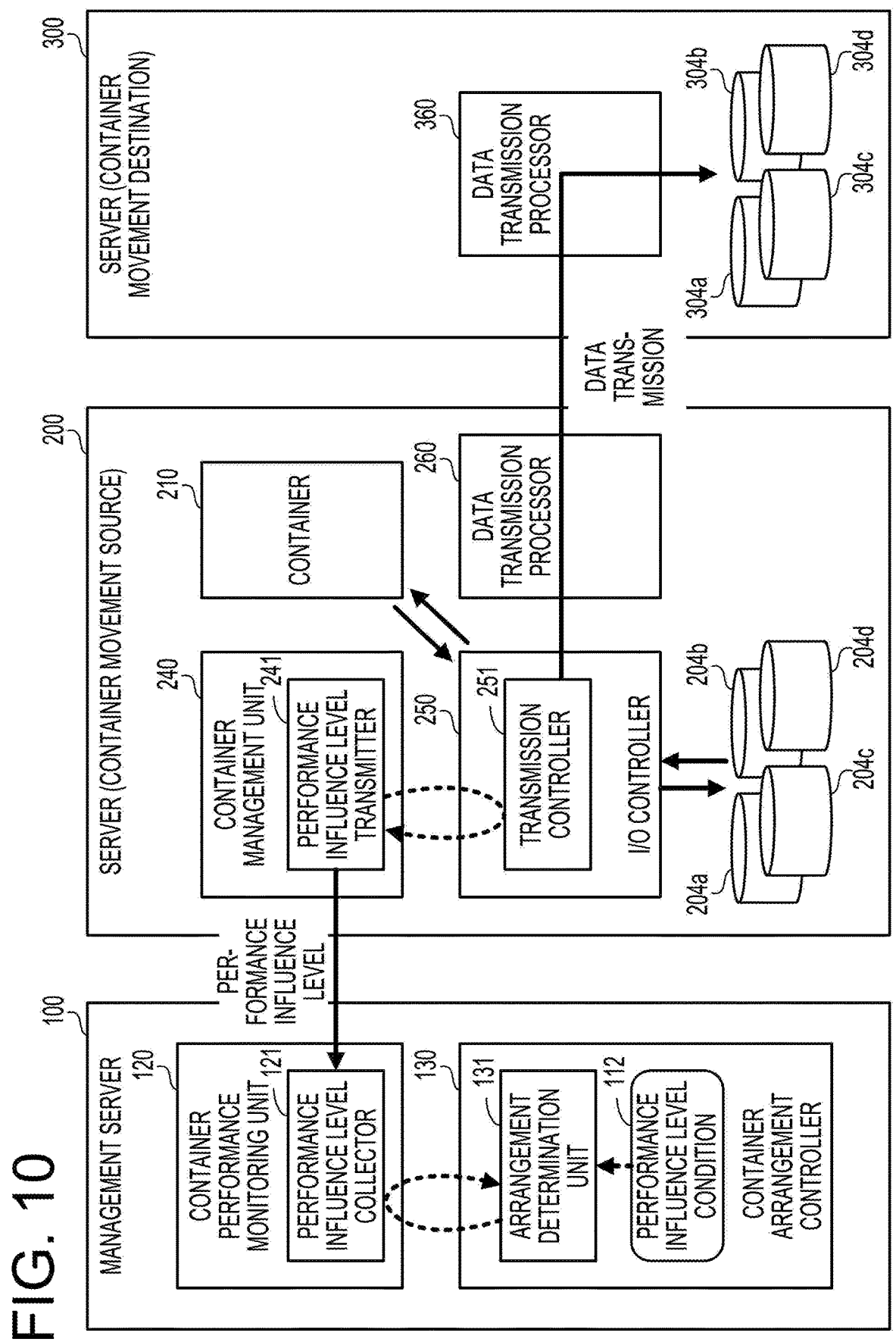
FIG. 10 is a view illustrating a state after a server is switched to an I/O transmission mode.

FIG. 10 is a view illustrating a state after a server is switched to the I/O transmission mode. The server 200 as the container movement source switches to the I/O transmission mode by activating the performance influence level transmitter 241 and the transmission controller 251.

Upon receiving an I/O request for the virtual storage 220 from the container 210, the transmission controller 251 executes an I/O processing for the virtual storage 220. In addition, the transmission controller 251 transmits I/O processing target data to the server 300 via the data transmission processor 260, and requests that the I/O processing target data be stored in the local storage of the server 300. A data transmission processor 360 of the server 300 stores the data transmitted from the server 200, in the local storage of the server 300. In the example of FIG. 10, the storages 304a to 304d are used as the local storage as a storage destination in the server 300.

For example, upon receiving a data write request for the virtual storage 220 from the container 210, the transmission controller 251 writes data to the virtual storage 220. Accordingly, the data is written to the local storage (the storages 204a to 204d) of the server 200. In addition, the transmission controller 251 transmits the data requested to be written to the server 300, so that the data is also written to the local storage of the server 300. Here, the transmission controller 251 records information indicating that data transmission has been completed for the data of a writing destination area in the virtual storage 220, in the transmission management information 231. When the transmission management information 231 is a bitmap, a bit corresponding to the writing destination area is updated to "1."

For example, upon receiving a request for data reading from the virtual storage 220, from the container 210, the transmission controller 251 reads the data requested to be read, from the virtual storage 220, and passes the data to the container 210. Here, the data is read from the local storage (the storages 204a to 204d). In addition, the transmission controller 251 transmits the data read from the virtual storage 220, to the server 300, so that the data is also written to the local storage of the server 300. Here, the transmission controller 251 records information indicating that data transmission has been completed for the data of a reading source area in the virtual storage 220, in the transmission management information 231. When the transmission management information 231 is a bitmap, a bit corresponding to the reading source area is updated to "1."

Meanwhile, the performance influence level transmitter 241 periodically acquires information indicating a transmission status of data on the virtual storage 220 by the transmission controller 251. Specifically, the performance influence level transmitter 241 reads the transmission management information 231 as such information. The performance influence level transmitter 241 calculates a performance influence level on the basis of the transmission management information 231, and transmits the performance influence level to the management server 100.

Here, the larger the amount of non-transmitted data among data pieces of the virtual storage 220, the higher the possibility that the performance of the moved container 310 (see FIG. 5) will be lowered when it is assumed that the container 210 has moved at that time point. This is because the larger the non-transmitted data amount, the higher the possibility that data will not be acquired from the local storage of the server 300 as a movement destination when the moved container 310 attempts to read the data of the virtual storage 320 (see, e.g., FIG. 5).

Therefore, in the present embodiment, as an example, the ratio of the data amount of non-transmitted data to the total data amount of the virtual storage 220 is calculated as a performance influence level. For example, it is assumed that the transmission management information 231 is a bitmap, the number of bits in the entire bitmap is B_all, and the number of bits each having a bit value of "1" (i.e., a bit indicating transmission completion) is B_t. Here, the performance influence level is calculated by the following equation (1).

$$\text{performance influence level} = 1 - B\_t/B\_all \qquad (1)$$

In this manner, the performance influence level is periodically transmitted from the server 200 as the container movement source to the management server 100. In the management server 100, the performance influence level collector 121 receives the performance influence level transmitted from the server 200. The arrangement determination unit 131 acquires the performance influence level received by the performance influence level collector 121, and compares the performance influence level to the performance influence level condition 112. Then, when the performance influence level satisfies the performance influence level condition 112, the arrangement determination unit 131 determines to execute movement of the container 210. For example, when the performance influence level condition 112 is "less than 20%," the arrangement determination unit 131 determines to execute the movement of the container 210 when the performance influence level becomes less than 20%.

Figure 11:
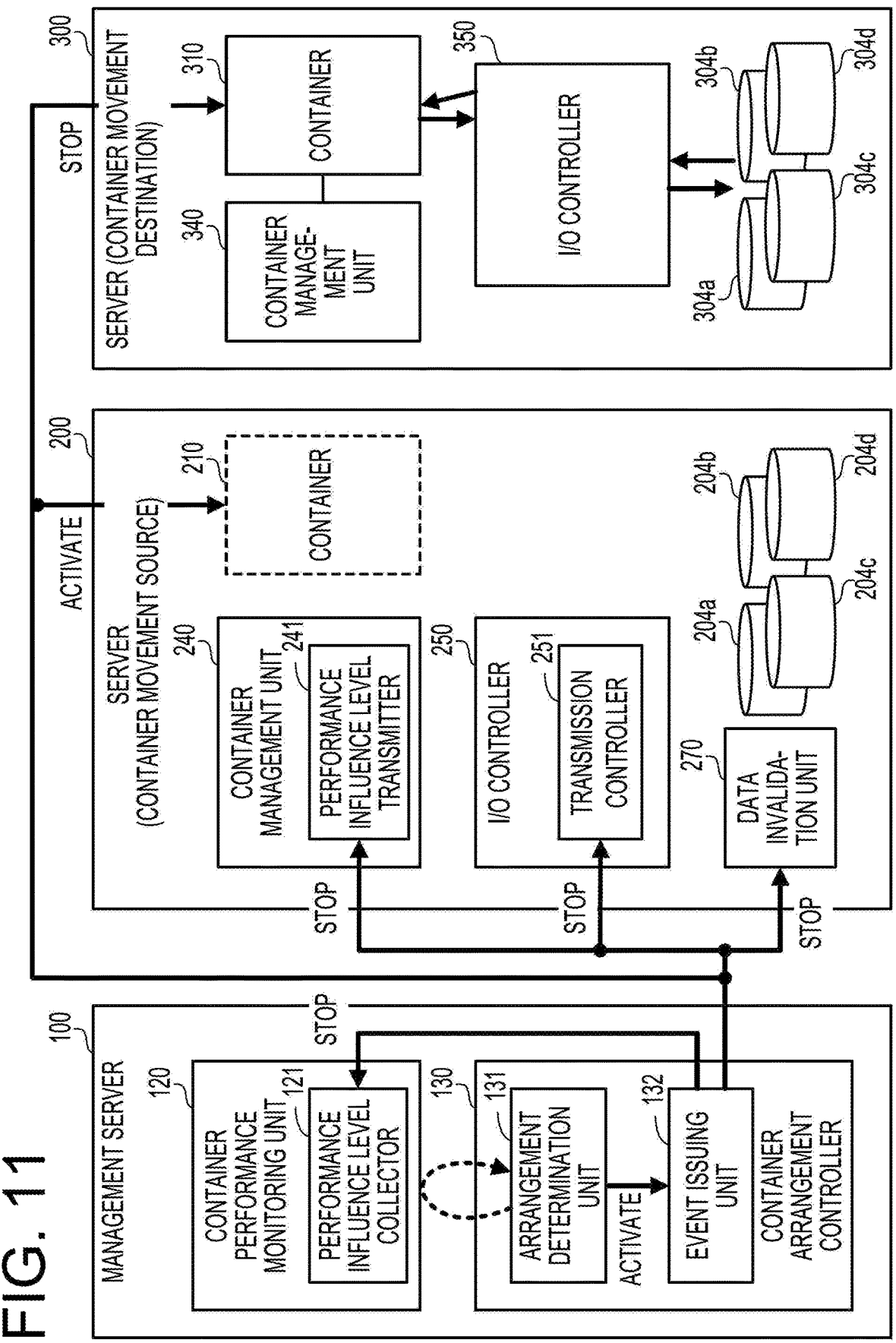
FIG. 11 is a view illustrating a state after execution of container movement is determined.

FIG. 11 is a view illustrating a state after execution of container movement is determined. When determining to execute the movement of the container 210, the arrangement determination unit 131 activates the event issuing unit 132 again.

The event issuing unit 132 stops the performance influence level transmitter 241 and the transmission controller 251 of the server 200 as the container movement source. Accordingly, the server 200 is switched from the I/O transmission mode to the normal mode. The event issuing unit 132 requests that the container management unit 240 of the server 200 stop the container 210, and requests that a container management unit 340 of the server 300 activate the container 310 corresponding to the container 210. Accordingly, the operation of the container 210 is stopped. The container 310 is activated using the container image corresponding to the container 210, the container image being copied to the local storage of the server 300. Accordingly, the container movement is completed.

The container 310 accesses the virtual storage 320 (see, e.g., FIG. 5) corresponding to the container 310 via an I/O controller 350 of the server 300. Here, when data requested to be read is stored in the local storage (the storages 304a to 304d) of the server 300, the data may be acquired from the local storage. Meanwhile, in actuality, for example, at a point in time when the activation of the container 310 is requested, the transmission management information 231 is copied from the server 200 to the server 300. The I/O controller 350 may determine whether the data requested to be read by the container 310 is stored in the local storage of the server 300 on the basis of the copied transmission management information 231.

The event issuing unit 132 of the management server 100 activates the data invalidation unit 270 of the server 200. The data invalidation unit 270 invalidates data that has already been transmitted to the server 300, among data pieces of the virtual storage 220 stored in the local storage (the storages 204a to 204d), on the basis of the transmission management information 231.

Then, as necessary, among the data pieces of the virtual storage 220 stored in the local storage (the storages 204a to 204d), data that has not been transmitted to the server 300 is transmitted to the server 300, and then is stored in the local storage (the storages 304a to 304d) of the server 300.

According to the above processing illustrated in FIG. 8 to FIG. 11, until the container movement is actually executed after the container 210 is detected as the movement target, data that is likely to be used by the moved container 310 is transmitted to the local storage of the server 300. Accordingly, by only transmitting a part of data in the virtual storage 220 of the server 200 before the container movement, it is possible to increase the probability that the moved container 310 accesses data in the local storage of the server 300. As a result, it is possible to suppress a reduction of the processing performance of the container 310 immediately after the container movement.

Next, a processing of the management server 100 and the servers 200, 300, 400, . . . will be described by using a flowchart.

Figure 12:
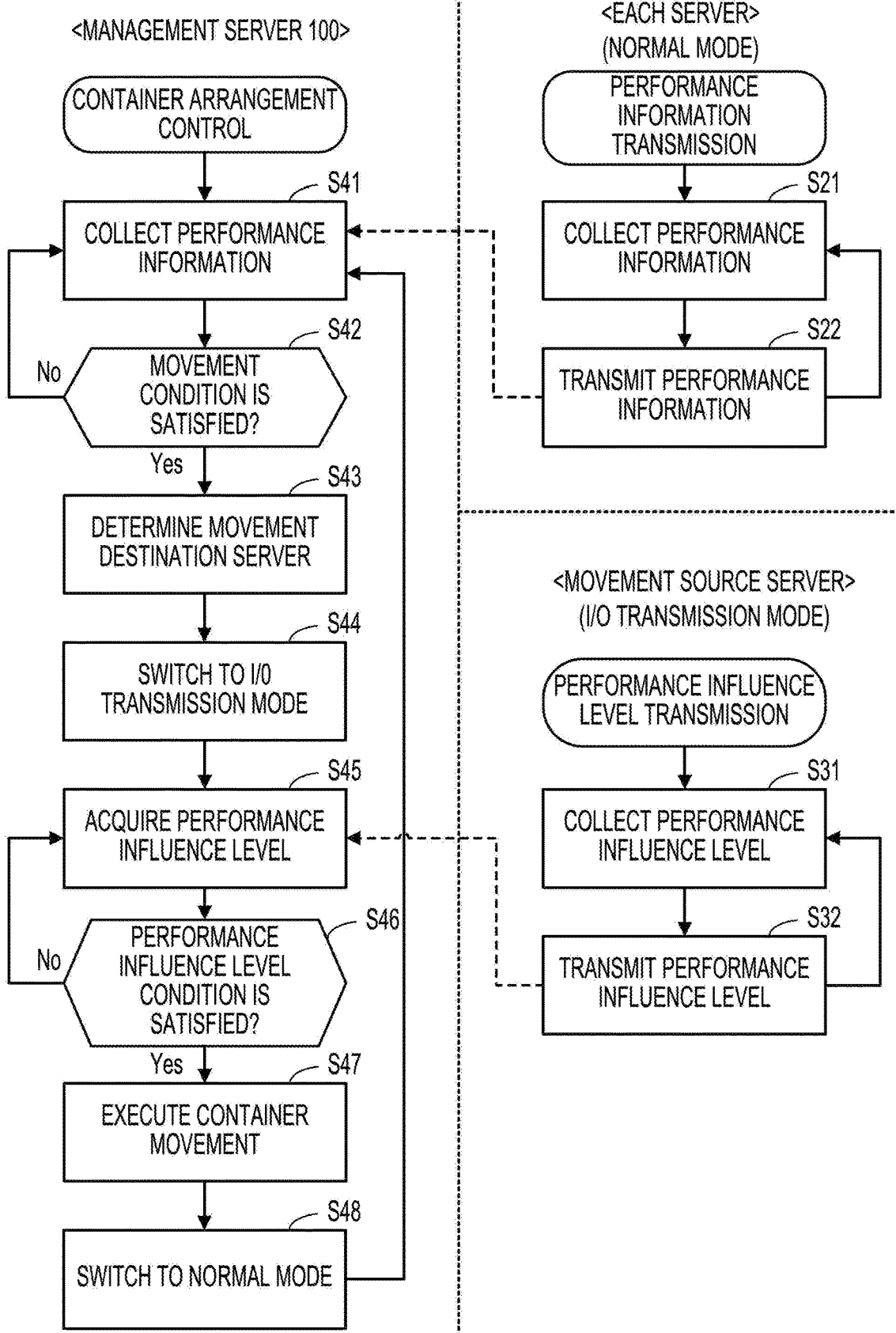
FIG. 12 is a flowchart illustrating a processing example on a container arrangement control.

First, FIG. 12 is a flowchart illustrating a processing example on a container arrangement control.

First, descriptions will be made on a performance information transmission processing of the servers 200, 300, 400, . . . in a normal mode. Here, as an example, a processing in the server 200 is illustrated, but the same processings are also executed in other servers 300, 400, . . . . Meanwhile, in the normal mode, in a server where a container is operating, the container accesses a virtual storage using a local storage via an I/O controller. For example, when the container 210 is operating in the server 200, the container 210 accesses the virtual storage 220 using the storages 204a to 204d via the I/O controller 250.

The container management unit 240 of the server 200 collects performance information on the server 200 (step S21). As the performance information, for example, the usage rate of the processor 201 or the memory 202 of the server 200, and the usage rate of the processor 201 or the memory 202 by an operating container are collected. The container management unit 240 transmits the collected performance information to the management server 100 (step S22). Then, after a certain time, the container management unit 240 executes the processing in step S21 again. That is, the processings in steps S21 and S22 are executed at regular time intervals.

Next, descriptions will be made on a performance influence level transmission processing of the servers 200, 300, 400, . . . in an I/O transmission mode. Here, as an example, it is assumed that the server 200 is switched to the I/O transmission mode. When the performance influence level transmitter 241 of the container management unit 240 is activated according to a request from the event issuing unit 132 of the management server 100, the server 200 is switched to the I/O transmission mode. Here, the transmission controller 251 of the I/O controller 250 is also activated. When it is assumed that the container 210 of the server 200 is detected as a movement target, when receiving an I/O request for the virtual storage 220 from the container 210, the transmission controller 251 executes an I/O processing according to the request, and transmits I/O request target data to a local storage of a server as a movement destination of the container 210. Meanwhile, the processing of the transmission controller 251 in the I/O transmission mode will be described below with reference to FIG. 13.

The performance influence level transmitter 241 of the server 200 collects a performance influence level related to the container 210 (step S31). Specifically, the performance influence level transmitter 241 reads the transmission management information 231 from the storage unit 230, as information indicating a transmission status of data on the virtual storage 220 by the transmission controller 251, and calculates a performance influence level by using the above described equation (1) on the basis of the transmission management information 231. The performance influence level transmitter 241 transmits the calculated performance influence level to the management server 100 (step S32). Then, after a certain time, the performance influence level transmitter 241 executes the processing in step S31 again. That is, the processings in steps S31 and S32 are executed at regular time intervals.

Next, a container arrangement control processing of the management server 100 will be described. When all the servers 200, 300, 400, . . . are operating in the normal mode, the server performance monitoring unit 120 of the management server 100 collects the performance information from each of the servers 200, 300, 400, . . . (step S41). Here, the performance information transmitted from each of the servers 200, 300, 400, . . . in the above described step S22 is received by the server performance monitoring unit 120.

The arrangement determination unit 131 of the container arrangement controller 130 acquires the performance information collected by the server performance monitoring unit 120, and determines whether there is a container whose performance information satisfies a movement condition included in the arrangement change condition 111 (step S42). As the movement condition, for example, a condition that the usage rate of a processor by the container exceeds a predetermined first value, or the usage rate of a memory by the container exceeds a predetermined second value is applied.

When there is no container whose performance condition satisfies the movement condition (step S42: No), after a certain time, the processing in step S41 is executed by the server performance monitoring unit 120. That is, while a container whose performance condition satisfies the movement condition is not being detected, the processings in steps S41 and S42 are executed at regular time intervals.

Meanwhile, when there is a container whose performance condition satisfies the movement condition (step S42: Yes), the arrangement determination unit 131 detects the container as a movement target. The arrangement determination unit 131 acquires performance information of each server among performance information pieces collected from servers other than a server where the container as the movement target operates, and compares the performance information to a movement destination condition included in the arrangement change condition 111. As the movement destination condition, for example, a condition that the usage rate of a processor in the server is lower than a predetermined third value, or the usage rate of a memory in the server is lower than a predetermined fourth value is applied. Then, the arrangement determination unit 131 determines a server whose performance condition satisfies the movement destination condition, as a server as a movement destination to which the container as the movement target is moved (step S43).

Hereinafter, it is assumed that the container 210 of the server 200 is detected as the movement target, and the server 300 is determined as a container movement destination. The arrangement determination unit 131 activates the event issuing unit 132. The event issuing unit 132 activates the performance influence level collector 121 of the server performance monitoring unit 120. The event issuing unit 132 requests the server 200 as a container movement source to activate the performance influence level transmitter 241 of the container management unit 240, and the transmission controller 251 of the I/O controller 250. Accordingly, the event issuing unit 132 switches the server 200 from the normal mode to the I/O transmission mode (step S44).

The arrangement determination unit 131 copies a container image corresponding to the container 210, which is stored in a local storage of the server 200, to a local storage of the server 300 as the container movement destination. The arrangement determination unit 131 transmits address conversion information indicating the correspondence between a logical address and a physical address of the virtual storage 220, to the server 300. Accordingly, the virtual storage 320 (see, e.g., FIG. 5) to be used by the moved container 310 is set in the server 300.

Next, the performance influence level collector 121 acquires a performance influence level from the server 200 as the container movement source (step S45). Here, the performance influence level collector 121 receives the performance influence level transmitted from the server 200 in the above described step S32. The arrangement determination unit 131 compares the performance influence level acquired by the performance influence level collector 121 to the performance influence level condition 112 (step S46).

For example, it is determined whether the performance influence level is less than 20%.

When the performance influence level does not satisfy the performance influence level condition 112 (step S46: No), after a certain time, the processing in step S45 is executed by the performance influence level collector 121. That is, while the performance influence level is not satisfying the performance influence level condition 112, the processings in steps S45 and S46 are executed at regular time intervals.

Then, when the performance influence level satisfies the performance influence level condition 112 (step S46: Yes), the arrangement determination unit 131 determines to execute the movement of the container 210. In this case, the arrangement determination unit 131 executes the container movement by activating the event issuing unit 132 again (step S47). The event issuing unit 132 stops the performance influence level transmitter 241 and the transmission controller 251 of the server 200 as the container movement source. Accordingly, the server 200 is switched from the I/O transmission mode to the normal mode (step S48). Further, the event issuing unit 132 requests the container management unit 240 of the server 200 to stop the container 210, and requests the container management unit 340 of the server 300 to activate the container 310 corresponding to the container 210. Accordingly, the operation of the container 210 is stopped. The container 310 is activated using the container image corresponding to the container 210, the container image being copied to the local storage of the server 300. Accordingly, the container movement is completed, and the process returns to step S41.

Figure 13:
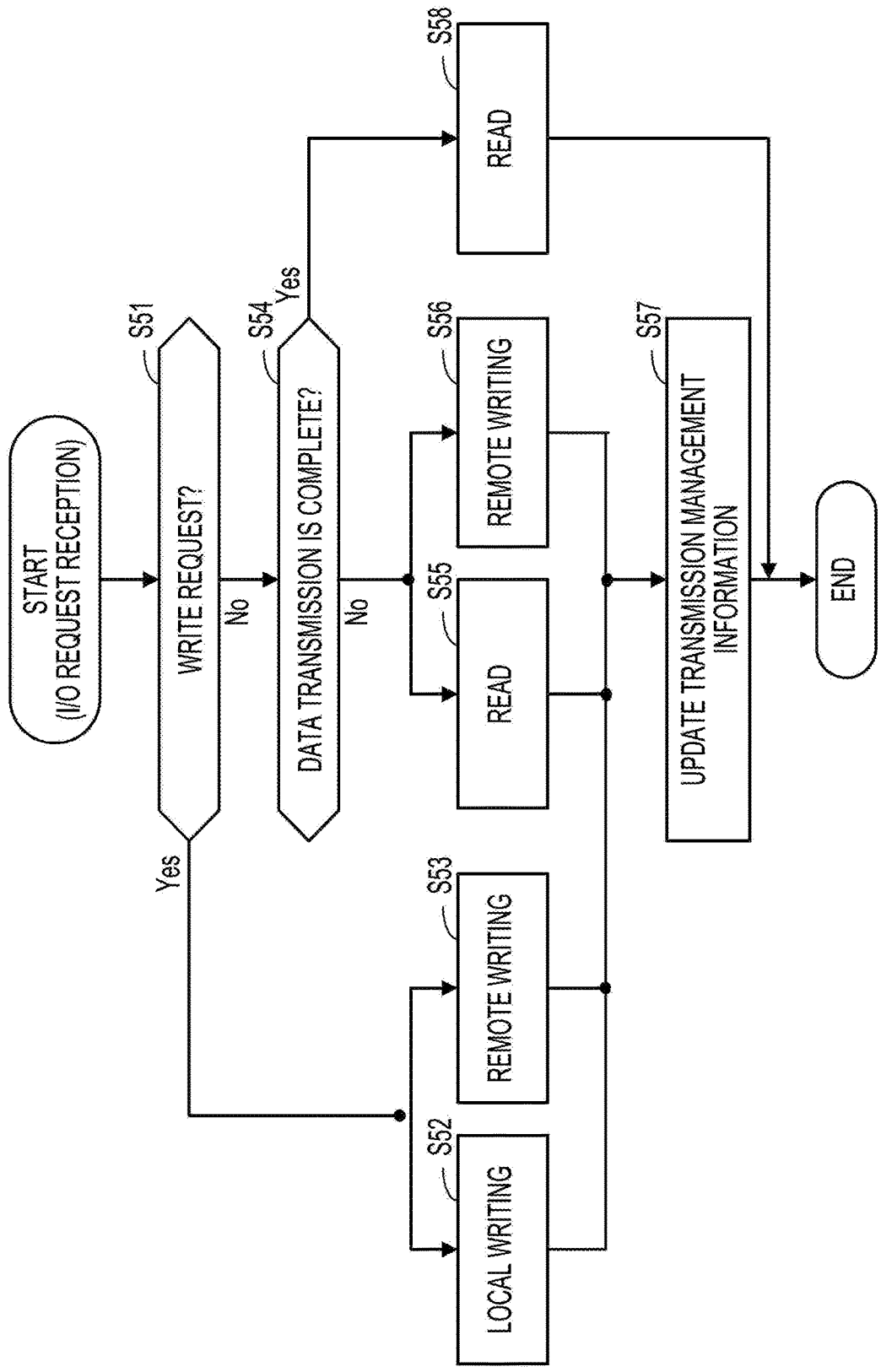
FIG. 13 is a flowchart illustrating an I/O processing example in a server in an I/O transmission mode.

FIG. 13 is a flowchart illustrating an I/O processing example in a server in an I/O transmission mode. Here, as an example, it is assumed that the container 210 operating in the server 200 is detected as a movement target. When an I/O request for the virtual storage 220, which is output from the container 210, is accepted by the transmission controller 251 of the I/O controller 250, a processing in FIG. 13 is executed.

(step S51) The transmission controller 251 executes processings in steps S52 and S53 when the I/O request is a write request, and executes a processing in step S54 when the I/O request is a read request.

(step S52) The transmission controller 251 writes data requested to be written, to the virtual storage 220. Here, the transmission controller 251 writes the data to a local storage of the server 200 (local writing).

(step S53) The transmission controller 251 transmits the data requested to be written, to a server as a movement destination of a container, and requests that the data be written to a local storage of the server (remote writing).

(step S54) The transmission controller 251 determines whether data of a reading source area in the virtual storage 220 has already been transmitted to a server as a movement destination of a container with reference to the transmission management information 231. The transmission controller 251 executes processings in steps S55 and S56 when the data has not been transmitted, and executes a processing in step S58 when the data has already been transmitted. For example, when the transmission management information 231 is a bitmap, the processings in steps S55 and S56 are executed when a bit corresponding to the reading source area is "0," and the processing in step S58 is executed when the bit is "1."

(step S55) The transmission controller 251 reads data requested to be read, from the virtual storage 220 (e.g., a local storage), and passes the data to the container 210.

(step S56) The transmission controller 251 transmits the data requested to be read, to the server as the movement destination of the container, and requests that the data be written to a local storage of the server (remote writing).

Meanwhile, when the processing in step S53 or step S56 is executed, the following processing is executed in the server as the movement destination of the container. The movement destination server writes the transmitted data to the local storage of the movement destination server. The movement destination server updates address conversion information indicating the correspondence between a logical address and a physical address of the virtual storage (e.g., the virtual storage 320 in FIG. 5) to be used by the moved container (e.g., the container 310 in FIG. 5). The address conversion information is information indicating the correspondence between a logical address and a physical address of the virtual storage 220, which is transmitted from the server 200 in step S44 in FIG. 12. The movement destination server updates a physical address corresponding to a logical address designated as a writing destination (in step S51: Yes) or a reading source (in step S54: No) among logical addresses within the address conversion information, to a data writing destination address in the local storage of the movement destination server. Accordingly, when accessing the corresponding logical address on the virtual storage, the moved container is capable of accessing the data on the local storage.

(step S57) When the processings in steps S52 and S53, or the processings in steps S55 and S56 are completed, a processing in step S57 is executed. The transmission controller 251 records information indicating that data transmission has been completed for the data of a writing destination area (when step S52 is executed), or the reading source area (when step S54 is executed) in the virtual storage 220, in the transmission management information 231. For example, when the transmission management information 231 is a bitmap, a bit corresponding to the writing destination area or the reading source area is updated from "0" to "1." When the bit corresponding to the writing destination area is already "1," the value of the bit is maintained as it is.

(step S58) The transmission controller 251 reads the data requested to be read from the virtual storage 220 (actually, the local storage), and passes the data to the container 210.

Figure 14:
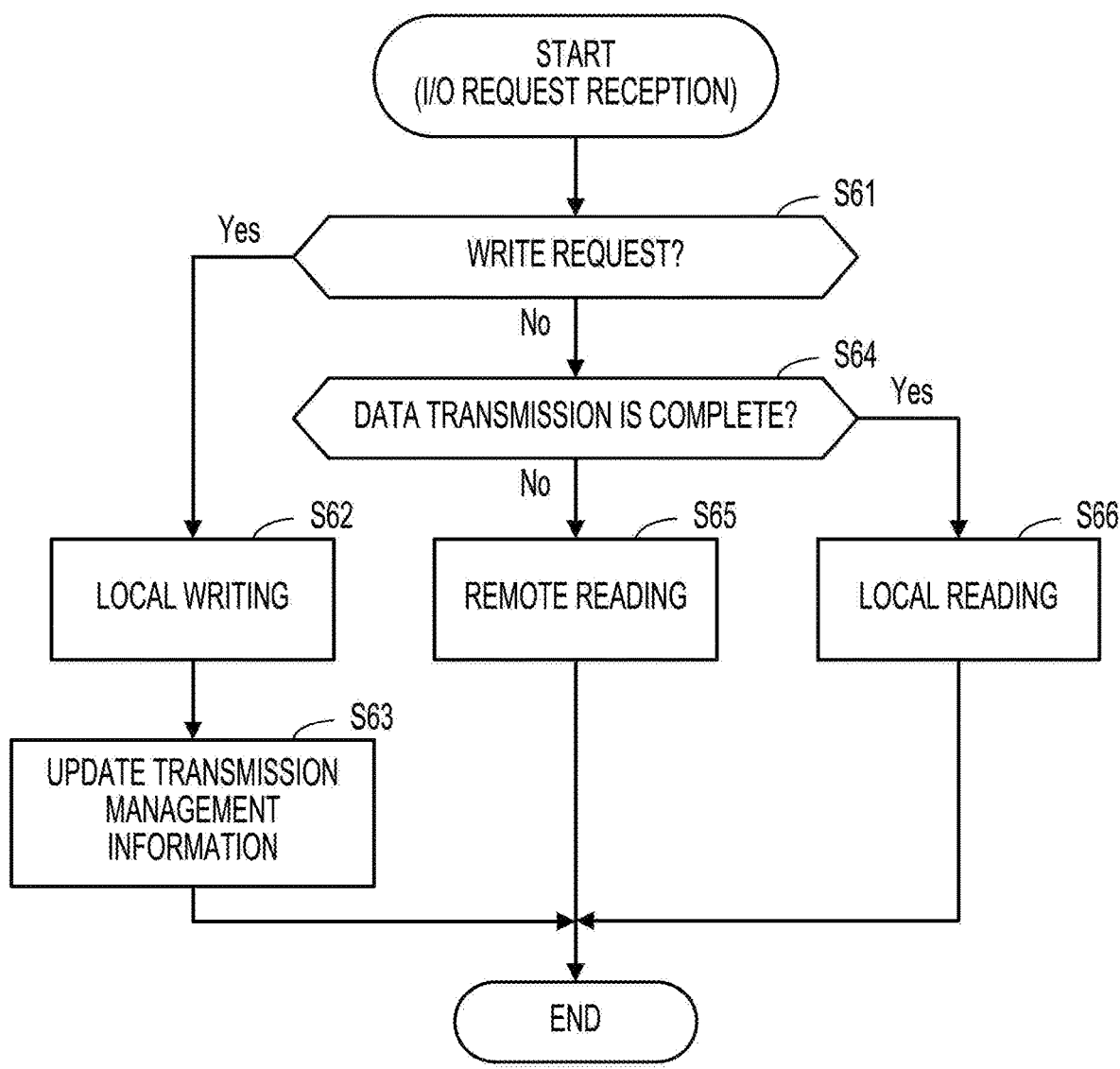
FIG. 14 is a flowchart illustrating an I/O processing example in a server in which a container is relocated.

FIG. 14 is a flowchart illustrating an I/O processing example in a server in which a container is relocated. In FIG. 14, as an example, descriptions will be made on a case where the container 310 is moved to the server 300. When the I/O request for the virtual storage 320, which is output from the container 310, is accepted by the I/O controller 350, a processing in FIG. 14 is executed.

Meanwhile, here, as an example, it is assumed that the I/O processing is controlled using the transmission management information 231 copied from the server 200 at a point in time when activation of the container 310 is requested from the server 200. The transmission management information 231 is stored in a storage unit of the server 300. In parallel to the processing in FIG. 14, non-transmitted data in the local storage of the server 200 is sequentially transmitted to the server 300. When transmission of the non-transmitted data (storing in the local storage of the server 300) is completed, the transmission management information 231 is updated.

(step S61) The I/O controller 350 executes a processing in step S62 when the I/O request is a write request, and executes a processing in step S64 when the I/O request is a read request.

(step S62) The I/O controller 350 writes data requested to be written to the virtual storage 320. Here, the I/O controller 350 writes the data to the local storage of the server 300 (local writing).

(step S63) When information related to a writing destination area in the transmission management information 231 indicates transmission incompletion, the I/O controller 350 updates the information to indicate transmission completion. For example, when the transmission management information 231 is a bitmap, a bit corresponding to the writing destination area is updated from "0" to "1." When the bit corresponding to the writing destination area is already "1," the value of the bit is maintained as it is.

(step S64) The I/O controller 350 determines whether data of a reading source area in the virtual storage 320 has already been transmitted from the local storage of the server 200 with reference to the transmission management information 231. The I/O controller 350 executes a processing in step S65 when the data has not been transmitted, and executes a processing in step S66 when the data has already been transmitted. For example, when the transmission management information 231 is a bitmap, the processing in step S65 is executed when a bit corresponding to the reading source area is "1," and the processing in step S66 is executed when the bit is "0."

(step S65) The I/O controller 350 acquires the data requested to be read, from the local storage of the server 200 via the server 200 (remote reading), and passes the data to the container 310.

(step S66) The I/O controller 350 reads the data requested to be read, from the local storage of the server 300 (local reading), and passes the data to the container 310.

As illustrated in FIG. 14 as above, when the reading target data has already been transmitted to the local storage of the server 300, the moved container 310 is capable of reading the data from the local storage without performing remote reading. The container arrangement control by the management server 100 increases the possibility that data that is likely to be accessed by the container 310 has already been transmitted to the local storage of the server 300. Therefore, the possibility that the remote reading is performed after the activation of the container 310 is lowered. As a result, the reduction of the processing performance of the container 310, which is caused by the container movement, is suppressed.

Third Embodiment

Hereinafter, descriptions will be made on a third embodiment in which a part of the processing in the above second embodiment is modified.

In the above second embodiment, the ratio of an amount of data not transmitted to the server 300 as a movement destination with respect to a data amount of the virtual storage 220 as an access destination of the container 210 before movement, is calculated as a performance influence level. This method is effective when an arrangement change is performed on a container that frequently accesses a virtual storage using a local storage, and frequently accesses the same data as before the movement even after the container is moved. This is because the larger the area where data has already been transmitted to the local storage on the moved server 300, the higher the probability that the moved container 310 will access data of the virtual storage 320 not in a remote manner but in a local manner. Accordingly, it is possible to suppress the performance influence level (the extent of performance reduction) of the container 310 immediately after the movement.

Meanwhile, in some cases, depending on the container, a frequency of accessing the same data as before the movement after the movement may be low. For example, a case where there is a large variation in an access destination area in the virtual storage or a case where a frequency of accessing the virtual storage, itself, is low is taken into consideration. In the case of a write request, the moved container does not need to access data before update, and may perform writing to the local storage of the movement destination server. Therefore, it may be said that a case where there are many write requests is also a case where a frequency of accessing the same data as before the movement after the movement becomes lower.

In order to deal with such a case, for example, a method of lowering a determination threshold for executing the container movement (a threshold of the performance influence level condition 112) is taken into consideration. Otherwise, a method of changing a calculation method of a performance influence level, itself, may also be taken into consideration. Hereinafter, descriptions will be made on a case where the latter method is used as the third embodiment.

In the present embodiment, a server switched to an I/O transmission mode counts the number of times first reading is requested for each area of a virtual storage at each fixed period (a collection period of a performance influence level). Then, the server calculates the number of times of first reading R_riops per second on the basis of the count value, and calculates the performance influence level by the following equation (2). The performance influence level=R_iops/V_iops . . . (2)

In the equation (2), V_iops is IOPS (Input/Output per second) indicating the capability of a container in an I/O processing for the virtual storage. For example, V_iops is given as a guaranteed value of such IOPS for the container. V_iops may be calculated on the basis of setting information (including information such as a capacity, and a physical storage configuration) of the container and the virtual storage as an access destination thereof, and may be set by a user operation.

The arrangement determination unit 131 of the management server 100 acquires the performance influence level calculated using the equation (2) from the server, and compares the performance influence level to a predetermined performance influence level condition 112 so as to determine to execute container movement. When the performance influence level is less than a threshold set as the performance influence level condition 112, execution of the container movement is determined. Meanwhile, the performance influence level condition 112 to be used is set according to a difference in a calculation method of the performance influence level, and may be different from the value used in the second embodiment.

The smaller the number of times of first reading per unit time, the lower the probability that a moved container will request reading from the virtual storage, and thus, the lower the probability that the moved container may perform a remote access. In particular, since the number of times of first reading per unit time is used instead of the total number of times of reading, the number of times of repeated reading from the same area in the virtual storage is not counted, and the number of areas that have been read at least once, among areas of the virtual storage, is counted. Therefore, when data transmission to a movement destination server is not performed before the container movement, it is possible to accurately count the number of times the moved container has to remotely access data within a movement source server in order to read the data after the container movement. When this number of times is small, it may be determined that a performance reduction of the moved container is small even when the container movement is executed. Therefore, it is possible to suppress the performance reduction of the moved container to the minimum by determining the execution timing of the container movement by using the performance influence level calculated using the equation (2).

Figure 15:
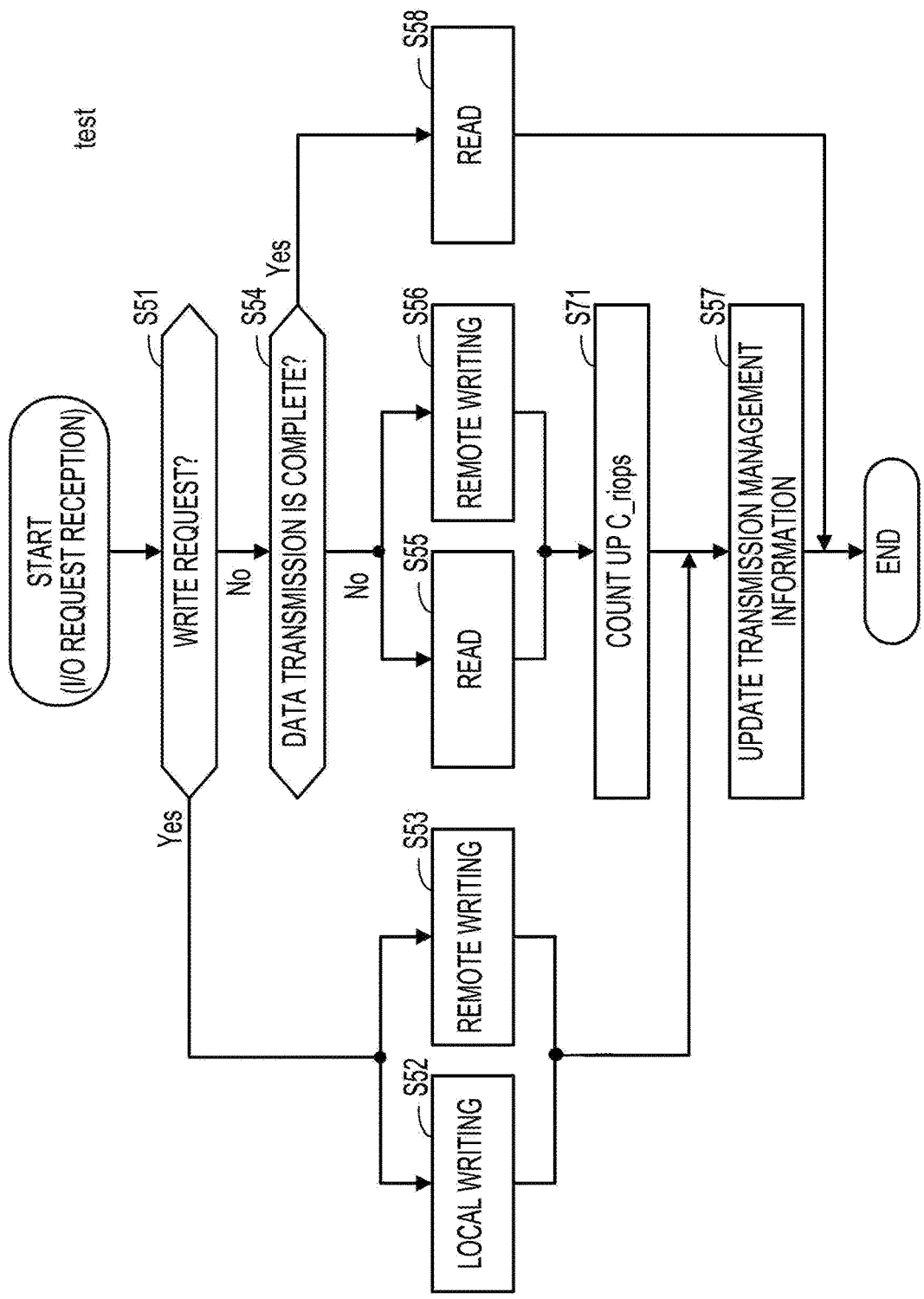
FIG. 15 is a flowchart illustrating an I/O processing example of a server in a third embodiment.

FIG. 15 is a flowchart illustrating an I/O processing example of a server in the third embodiment. FIG. 15 illustrates an I/O processing example in a container movement source server switched to an I/O transmission mode, and the processings having the same contents as those in FIG. 13 are denoted by the same step numbers in the illustration. Hereinafter, as in FIG. 13, it is assumed that the container 210 is detected as a movement target, and the server 200 is a container movement source server. Also, it is assumed that the storage unit 230 stores a count value C_riops.

FIG. 15 is different from FIG. 13 in that a processing in step S71 is executed between steps S55 and S56, and step S57. In step S71, the transmission controller 251 counts up a count value C_riops. By this processing in step S71, the number of times of first data reading for data stored in the virtual storage 220 is counted. The first data reading refers to execution of reading data that has not been read after written or updated.

Figure 16:
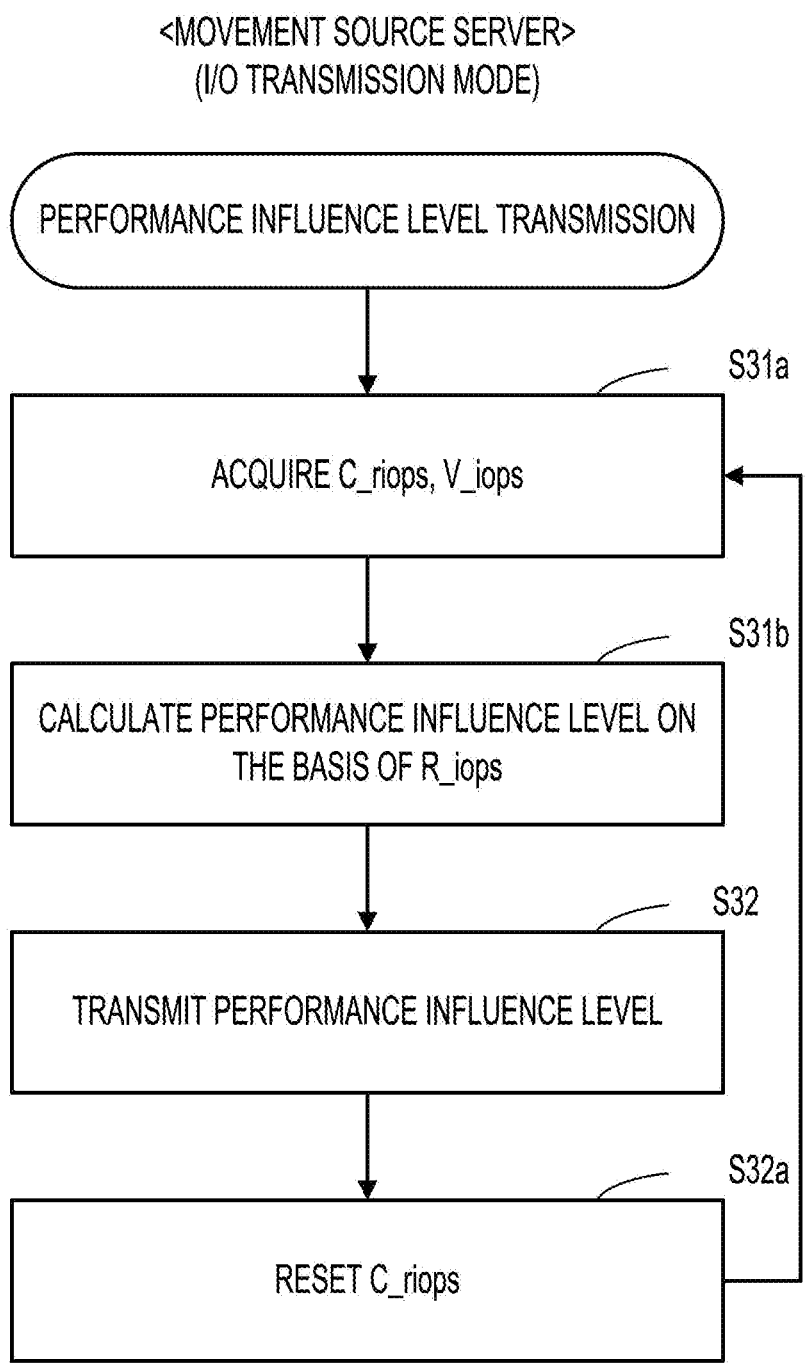
FIG. 16 is a flowchart illustrating a performance influence level transmission processing example of a container movement source server in the third embodiment.

FIG. 16 is a flowchart illustrating a performance influence level transmission processing example of a container movement source server in the third embodiment. In FIG. 16, the processings having the same contents as those in FIG. 12 are denoted by the same step numbers in the illustration. As in FIG. 12, it is assumed that the container 210 of the server 200 is detected as a movement target, and the server 200 is switched to an I/O transmission mode.

FIG. 16 is different from FIG. 12 in that instead of step S31, steps S31a and S31b are executed, and after step S32, step S32a is executed. That is, the performance influence level transmitter 241 of the server 200 acquires a count value C_riops from the storage unit 230. The performance influence level transmitter 241 acquires V_iops that is stored in the storage unit 230 in advance (step S31a). The performance influence level transmitter 241 calculates the number of times of first reading R_riops per second by dividing the count value C_riops by an acquisition period of a performance influence level, and calculates the performance influence level by using the above described equation (2) (step S31b). The performance influence level transmitter 241 transmits the calculated performance influence level to the management server 100 (step S32), and resets the count value C_riops of the storage unit to "0" (step S32a). Then, after a certain time, the performance influence level transmitter 241 executes the processing in step S31a again. That is, the processings in steps S31a and S32a are executed at regular time intervals.

According to the above processing in the third embodiment, as in the second embodiment, until the container movement is actually executed after the container 210 is detected as the movement target, data that is likely to be used by the moved container 310 is transmitted to the local storage of the server 300. Accordingly, by only transmitting a part of data in the virtual storage 220 of the server 200 before the container movement, it is possible to increase the probability that the moved container 310 accesses data in the local storage of the server 300. As a result, it is possible to suppress a reduction of the processing performance of the container 310 immediately after the container movement. Then, it is possible to obtain such an effect for a container with a relatively low frequency of accessing the same data as before the movement after the movement, as well.

<Modification>

In a modification of the second and third embodiments, a container arrangement control may be performed by using both a performance influence level based on the equation (1) and a performance influence level based on the equation (2). For example, the storage unit 110 of the management server 100 stores a performance influence level condition corresponding to the equation (1) and a performance influence level condition corresponding to the equation (2). In step S45 of FIG. 12, the performance influence level collector 121 acquires both the performance influence level based on the equation (1), and the performance influence level based on the equation (2) from a movement source server of a container. Then, the arrangement determination unit 131 executes the following processing in step S46 of FIG. 12.

First, the arrangement determination unit 131 determines whether the performance influence level based on the equation (2) satisfies the performance influence level condition corresponding to the equation (2). When the condition is satisfied, the process proceeds to step S47. Accordingly, when it is determined that a frequency of accessing the same data as before movement of the container after the movement is likely to be low, and the performance reduction of the moved container is small, the container movement may be executed.

Meanwhile, when the above condition is not satisfied, the arrangement determination unit 131 determines whether the performance influence level based on the equation (1) satisfies the performance influence level condition corresponding to the equation (1). When the condition is not satisfied, the process returns to step S45. Meanwhile, when the condition is satisfied, the process proceeds to step S47. Accordingly, when it is thought that a frequency of accessing the same data as before the container movement after the movement is relatively high, the container movement may be executed after data likely to be accessed is transmitted to a certain extent.

In the second and third embodiments and the modification thereof as described above, a control of container arrangement between servers has been described. However, such an arrangement control is also applicable to a case where a hypervisor-type virtual machine is moved between servers (between actual machines) instead of a container.

Meanwhile, processing functions of devices described in each of the above embodiments (e.g., the information processing apparatuses 10 and 20, the management device 30, the management server 100, the servers 200, 300, 400, . . . ) are realizable by a computer. In this case, a program describing processing contents of functions that each device needs to have is provided, and the above processing functions are realized on the computer by executing the program by the computer. The program describing the processing contents may be recorded in a computer-readable recording medium. The computer-readable recording medium includes a magnetic storage device, an optical disc, a magneto-optical recording medium, a semiconductor memory, etc. The magnetic storage device includes a hard disk device (HDD), a magnetic tape, etc. The optical disc includes a compact disc (CD), a digital versatile disc (DVD), a Blu-ray disc (BD, registered trademark), etc. The magneto-optical recording medium includes a magneto-optical (MO) disk, etc.

When the program is distributed, for example, a portable recording medium, such as a DVD or a CD, in which the program is recorded is sold. The program may be stored in a storage device of a server computer, and may be transmitted from the server computer to other computers via a network.

The computer that executes the program stores the program recorded in the portable recording medium or the program transmitted from the server computer, in, for example, its own storage device. Then, the computer reads the program from its own storage device, and executes processings according to the program. Meanwhile, the computer may directly read the program from the portable recording medium to execute processings according to the program. Each time the program is transmitted from the server computer connected via the network, the computer may sequentially execute processings according to the received program.

In one aspect, when a virtual process execution unit is relocated between physical machines, it is possible to suppress the reduction of I/O processing performance of the corresponding process execution unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
   a first information processing apparatus coupled to a first storage, the first information processing apparatus including a first processor configured to:
      execute, while a virtual processor that is operated in the first information processing apparatus executes an I/O processing for the first storage, a copy processing of copying target data of the I/O processing from the first storage to a second storage coupled to a second information processing apparatus via the second information processing apparatus, as a pre-processing of a relocation processing in which the virtual processor is relocated from the first information processing apparatus to the second information processing apparatus; and
   a management device including a second processor configured to:
      determine an execution timing of the relocation processing based on a performance influence level of I/O processing to be executed by the virtual processor when the virtual processor is relocated to the second information processing apparatus, the performance influence level being calculated from a result of monitoring I/O processing including the copy processing for the first storage executed by the virtual processor after start of the pre-processing;
      execute the relocation processing at the execution timing by sending commands to the first information processing apparatus and the second information processing apparatus; and use, as information that indicates a copy status, a ratio of a data amount not copied to the second storage with respect to a data amount stored in the first storage,
wherein the first storage is a local storage of the first information processing apparatus and the second storage is a local storage of the second information processing apparatus.

2. The information processing system according to claim 1, wherein
the second processor is further configured to
determine the execution timing by using, as the performance influence level, a number of times of first data reading for data stored in the first storage per unit time by the virtual processor that is operated in the first information processing apparatus, the first data reading being execution of reading data that has not been read.

3. The information processing system according to claim 2, wherein
the second processor is further configured to
determine the execution timing by using, as the performance influence level, the information that indicates the copy status of data from the first storage to the second storage according to execution of the I/O processing for the first storage by the virtual processor that is operated in the first information processing apparatus.

4. The information processing system according to claim 1, wherein
the second processor is further configured to
start the pre-processing when the second processor determines the second information processing apparatus as a relocation destination of the virtual processor based on an operating status of each of a plurality of information processing apparatuses including the second information processing apparatus.

5. The information processing system according to claim 1, wherein
the virtual processor is a container generated by a container virtualization technology.

6. The information processing system according to claim 1, wherein when the virtual processor is relocated from the first information processing apparatus to the second information processing apparatus, the virtual processor is operated in the second information processing apparatus, and
the second information processing apparatus includes a third processor that is configured to:
execute an I/O processing for the second storage, for data copied to the second storage, among data stored in the first storage, and
execute an I/O processing for the first storage, for data not copied to the second storage, among data stored in the first storage, via the first information processing apparatus.

7. The information processing system according to claim 1, wherein the second processor is further configured to determine an information processing apparatus as a movement destination of the virtual processor based on performance information from a plurality of information processing apparatuses other than the first information processing apparatus in which the virtual processor operates.

8. A management device comprising:
a memory; and
a processor coupled to the memory and the processor configured to:
cause a first information processing apparatus to execute, while a virtual processor that is operated in the first information processing apparatus executes an I/O processing for a first storage coupled to the first information processing apparatus, a copy processing of copying target data of the I/O processing from the first storage to a second storage coupled to a second information processing apparatus via the second information processing apparatus, as a pre-processing of a relocation processing in which the virtual processor is relocated from the first information processing apparatus to the second information processing apparatus;
determine an execution timing of the relocation processing based on a performance influence level of I/O processing to be executed by the virtual processor when the virtual processor is relocated to the second information processing apparatus, the performance influence level being calculated from a result of monitoring I/O processing including the copy processing for the first storage executed by the virtual processor after start of the pre-processing;
execute the relocation processing at the execution timing by sending commands to the first information processing apparatus and the second information processing apparatus; and
use, as information that indicates a copy status, a ratio of a data amount not copied to the second storage with respect to a data amount stored in the first storage,
wherein the first storage is a local storage of the first information processing apparatus and the second storage is a local storage of the second information processing apparatus.

9. The management device according to claim 8, wherein
the processor is further configured to
determine the execution timing by using, as the performance influence level, a number of times of first data reading for data stored in the first storage per unit time by the virtual processor that is operated in the first information processing apparatus, the first data reading being execution of reading data that has not been read.

10. The management device according to claim 9, wherein
the processor is further configured to
determine the execution timing by using, as the performance influence level, the information that indicates the copy status of data from the first storage to the second storage according to execution of the I/O processing for the first storage by the virtual processor that is operated in the first information processing apparatus.

11. The management device according to claim 8, wherein
the processor is further configured to
start the pre-processing when the second processor determines the second information processing apparatus as a relocation destination of the virtual processor based on an operating status of each of a plurality of information processing apparatuses including the second information processing apparatus.

12. A non-transitory computer-readable recording medium having stored therein a program that causes a computer to execute a process, the process comprising:
causing a first information processing apparatus to execute, while a virtual processor that is operated in the first information processing apparatus executes an I/O processing for a first storage coupled to the first information processing apparatus, a copy processing of copying target data of the I/O processing from the first storage to a second storage coupled to a second information processing apparatus via the second information processing apparatus, as a pre-processing of a relocation processing in which the virtual processor is relocated from the first information processing apparatus to the second information processing apparatus;

determining an execution timing of the relocation processing based on a performance influence level of I/O processing to be executed by the virtual processor when the virtual processor is relocated to the second information processing apparatus, the performance influence level being calculated from a result of monitoring I/O processing including the copy processing for the first storage executed by the virtual processor after start of the pre-processing;

executing the relocation processing at the execution timing by sending commands to the first information processing apparatus and the second information processing apparatus;

using, as information that indicates a copy status, a ratio of a data amount not copied to the second storage with respect to a data amount stored in the first storage, wherein the first storage is a local storage of the first information processing apparatus and the second storage is a local storage of the second information processing apparatus.

* * * * *